(12) United States Patent
Ebina et al.

(10) Patent No.: US 8,206,814 B2
(45) Date of Patent: Jun. 26, 2012

(54) FILM MADE FROM DENATURED CLAY

(75) Inventors: Takeo Ebina, Miyagi (JP); Kiyoshi Kobayashi, Miyagi (JP); Ryo Ishii, Miyagi (JP); Tatsuhiro Okada, Ibaraki (JP); Fujio Mizukami, Miyagi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 11 days.

(21) Appl. No.: 12/029,203

(22) Filed: Feb. 11, 2008

(65) Prior Publication Data

US 2009/0202806 A1 Aug. 13, 2009

(51) Int. Cl.
*C08K 3/34* (2006.01)
*C09D 1/00* (2006.01)
*C09D 101/02* (2006.01)
*B32B 5/06* (2006.01)
*B32B 19/04* (2006.01)

(52) U.S. Cl. .......... 428/220; 428/452; 106/287.17; 106/204.3; 442/59; 442/76; 524/445

(58) Field of Classification Search .......... 428/220, 428/452; 106/287, 204.3; 524/445; 442/59, 442/76; 427/336
See application file for complete search history.

(56) References Cited

U.S. PATENT DOCUMENTS

| 5,256,615 A * | 10/1993 | Oomura et al. | 502/62 |
| 7,160,942 B2 | 1/2007 | Chaiko | |
| 2004/0138339 A1 * | 7/2004 | Freeman et al. | 523/200 |
| 2007/0027248 A1 * | 2/2007 | Ebina et al. | 524/445 |

FOREIGN PATENT DOCUMENTS

| EP | 1918250 A1 * | 5/2008 |
| JP | 61-3767 | 2/1986 |
| JP | 5-254824 | 10/1993 |

(Continued)

OTHER PUBLICATIONS

Masanobu, Onikata, Properties of Organophilic Bentonite and Future Prospects, May 2003, Smectite Research Group, vol. 13, No. 1, 1-40.*

(Continued)

*Primary Examiner* — David Sample
*Assistant Examiner* — Tahseen N Khan
(74) *Attorney, Agent, or Firm* — Oblon, Spivak, McClelland, Maier & Neustadt, L.L.P.

(57) ABSTRACT

The present invention provides a novel technology and a novel material having excellent pliability, gas barrier properties and water resistance, for the technical fields of packaging materials, sealing materials, electric insulating materials and the like, the present invention relates to a film of a material having a denatured clay as a main constituent thereof, wherein (1) the film comprises a denatured clay and an additive, (2) the weight ratio of the denatured clay is not less than 70% relative to total solids, (3) the film has gas barrier properties and water-vapor barrier properties, (4) the film has heat resistance, (5) the film has water resistance, (6) the film has sufficient mechanical strength to be used as a self-supporting film, and (7) the film can be formed on the surface of metals, plastics, rubber, paper and the like, and the present invention can provide a material comprising the denatured clay film in which denatured clay particles are highly oriented and which has excellent heat resistance, excellent pliability, excellent gas barrier properties, excellent water-vapor barrier properties, and high water resistance.

41 Claims, 3 Drawing Sheets

FOREIGN PATENT DOCUMENTS

| | | |
|---|---|---|
| JP | 6-95290 | 4/1994 |
| JP | 7-17371 | 3/1995 |
| JP | 7-251489 | 10/1995 |
| JP | 52-15807 | 2/1997 |
| JP | 63-64913 | 3/1998 |
| JP | 10-231434 | 9/1998 |
| JP | 2002-30255 | 1/2002 |
| JP | 2007-277078 | 10/2007 |
| WO | WO 2005/023714 A1 | 3/2005 |
| WO | WO 2006/062209 A1 | 6/2006 |
| WO | WO 2007015534 A1 * | 2/2007 |

OTHER PUBLICATIONS

"Denatured." Merriam-Webster Online Dictionary. 2009. Merriam-Webster Online. Oct. 13, 2009 <http://www.merriam-webster.com/dictionary/denatured>.*

U.S. Appl. No. 11/721,403, filed Jun. 11, 2007, Take Ebina, et al.

Haruo Shiramizu, "Clay Mineralogy (Nendo Kobutsu Gaku)—Basics of Clay Science", Asakura Shoten, 1988, 4 pages.

Masanobu Onikata, SMECTITE, vol. 8, No. 2, 1998, pp. 8-13.

Yasushi Umemura, "Preparation of Methylene Blue-Clay Hybrid Films by a Modified Langmuir-Blodgett Method and Molecular Orientation of Methylene Blue in the Film", Nendo Kagaku, vol. 42, No. 4, 2003, pp. 218-222 (with English Abstract).

Kostas S. Triantafyllidis, et al., "Epoxy—Clay Fabric Film Composites with Unprecedented Oxygen-Barrier Properties", Chem. Matter., vol. 18, 2006, pp. 4393-4398.

David J. Chaiko, "New Poly(ethylene oxide)—Clay Composites", Chem. Matter., vol. 15, 2003, pp. 1105-1110.

Masanobu Onikata, "Properties of Organophilic Bentonite and Future Prospects", Smectite Research Group, Newsletter, vol. 13, No. 1, May 2003, pp. 2-15 (with English translation).

* cited by examiner

FILM MADE FROM DENATURED CLAY

BACKGROUND OF THE INVENTION

1. Field of the Invention

The present invention relates to a material having a denatured clay as a main constituent thereof, and more particularly, to a novel material having a structure in which the layering of inorganic layered compound particles is highly oriented, the novel material being flexible and having water resistance, gas barrier properties, and sufficient mechanical strength to be used as a self-supporting film. In the technical fields of packaging materials, sealing materials and insulating materials, there has been a strong demand for the development of materials that have high gas-blocking properties, high water-vapor blocking properties, that are water-resistant, pliable and have heat resistance so as to allow them to be used in wet environments. The present invention has been developed in the light of the above situations and provides a novel technology and a novel material having high water resistance, high pliability, excellent water-vapor barrier properties and gas barrier properties, and which can be suitably used in a gas barrier film or the like.

2. Description of the Related Art

Most gas barrier materials having excellent pliability have been manufactured hitherto using as a base an organic polymer material, although the gas barrier properties of such materials are arguably far from perfect. The heat resistance of such organic polymer materials is highest for engineering plastics, at about 350° C. For achieving gas barrier materials at temperatures higher than that there must be employed inorganic sheets or metal sheets. Inorganic sheets are obtained by working a natural mineral such as mica, vermiculite or the like, or a synthetic mineral, into a sheet shape. Such sheets, which have high heat resistance and which are used as temporary gas sealing members in gland packing, cannot however be molded compactly, which precludes blocking completely the paths in the sheet through which minute gas molecules flow. The gas barrier properties of inorganic sheets are thus not particularly high. Also, gaskets of consolidated graphite lack sufficient gas barrier properties, and the use temperature thereof is limited to about 450° C. When high gas barrier properties are required at high temperatures, therefore, it becomes necessary to use metal sheets. The use of metal sheets requires strong fastening mechanisms, while surface damage during fastening may give rise to leaks. Metal sheets are also problematic in that, for instance, they do not afford electric insulation and cannot adapt to volume changes of surrounding members during heating or cooling, as a result of which there may form gaps that give rise to leaks.

In applications that involve use under higher temperature conditions than ordinary temperature, for instance, gas sealing in chemical plants, there are required films capable of being used under higher temperature conditions than those of conventional materials. In terms of preventing health hazards, in particular, there are required heat-resistant and asbestos-free gas barrier materials for joint sheets. Also, microwavable and/or boiling-water heatable materials such as materials having high gas barrier properties, high water-vapor barrier properties, as well as hot water resistance at temperatures of 120° C. or above, are demanded in food packaging materials.

Inorganic layered compounds such as swelling clay or the like are known to form a film having evenly oriented particles by dispersing the inorganic layered compound in water or alcohol, spreading the dispersion onto a glass sheet and letting it stand to dry. For example, oriented specimens for X-ray diffraction have been prepared using this method (Haruo Shiramizu, "Clay Mineralogy (Nendo Kobutsu Gaku)—Basics of Clay Science", Asakura Shoten, p. 57 (1988)). However, when a film was formed on a glass sheet, it was difficult to strip the inorganic layered compound thin film off the glass sheet, while cracks formed in the thin film during strip-off, among other problems that made it difficult to obtain a self-supporting film. Even if the film was stripped successfully off the glass sheet, the resulting film was brittle and lacked sufficient strength. To date, it has been difficult to manufacture an even-thickness film free of pinholes and having excellent gas barrier properties.

Meanwhile, various polymeric resins are used as molding materials, and also as dispersants, thickeners, binders, and as gas barrier materials having inorganic materials blended therein. For instance, a known film having gas barrier properties may be obtained by manufacturing a film having a thickness of 0.1 to 50 μm from a composition comprising 100 parts by weight of a mixture of (A) a highly hydrogen-bondable resin containing two or more carboxyl groups per molecule, such as polyacrylic acid or the like, and (B) a highly hydrogen-bondable resin containing two or more hydroxyl groups in its molecular chain, for instance starch or the like, to a weight ratio A/B=80/20 to 60/40, and 1 to 10 parts by weight of an inorganic layered compound such as a clay mineral or the like; and by subjecting then the film to a thermal treatment and an electron beam treatment (Japanese Patent Application Laid-open No. H10-231434). The above film is problematic, however, in that the main component thereof is a water-soluble polymer resin, so heat resistance is not very high.

Also, a laminated film having excellent moisture resistance and gas barrier properties, suitable for food packaging, can be obtained by laminating a layer composed of a resin composition comprising a resin and an inorganic layered compound between two polyolefin-based resin layers (Japanese Patent Application Laid-open No. H07-251489). In this case, however, the layer of resin composition comprising an inorganic layered compound is merely used as part of a multilayer film, and not on its own as a self-supporting film. Also, the heat resistance of such laminated films is governed by the organic material having the lowest heat resistance in the composition, in this case a polyolefin, which is a material that, ordinarily, does not afford high heat resistance.

Various clays such as smectite, mica, talc, vermiculite or the like are added as fillers to plastic with a view to enhancing the heat resistance and/or gas barrier properties of the plastic. Smectite, having high water dispersibility, is hydrophilic, and hence has low compatibility with hydrophobic plastic. It is thus difficult to achieve a high-dispersion composite of smectite as-is in plastic. When forming a composite with hydrophobic plastic, therefore, clay is reformed and is used as a denatured clay having controlled hydrophilicity/hydrophobicity (Masanobu Onikata, SMECTITE, Vol. 8, No. 2, pp 8-13 (1998)). There are two methods for manufacturing denatured clay. One method involves ionic exchange with quaternary ammonium cations or quaternary phosphonium cations. Depending on their type and the ratio at which they are introduced, these organic cations allow controlling hydrophilicity/hydrophobicity. It has been reported that, among such organic cations, using a quaternary phosphonium cation affords higher heat resistance than using a quaternary ammonium cation (Japanese Patent Application Laid-open No. H06-95290). Various solvents can be selected based on the hydrophilicity/hydrophobicity level. Another method for manufacturing clay involves silylation. Hydroxyl groups present at the ends of clay crystals react with an added silylating agent, as a result of which such ends can be made hydrophobic. In this case as well, hydrophilicity/hydrophobicity can be controlled based on the silylating agent type and the ratio at which it is introduced. These two reformation methods can be used in combination. However, no self-supporting film material has been developed thus far using such a denatured clay as a main component. Organification is carried out ordinarily using quaternary alkyl ammonium chloride reagents. This is problematic in that, as a result, high chlorine concentrations are generated even after washing with water, which disqualifies this approach for applications where chlorine contamination is undesirable.

Recently, there have been manufactured inorganic layered compound thin films using the Langmuir-Blodgett Method (for instance, Y. Umemura, Nendo Kagaku, Vol. 42, No. 4, 218-222 (2003)). This method, however, involves forming an inorganic layered compound thin film on a substrate surface finished with a material such as glass or the like, and precludes achieving an inorganic layered compound thin film strong enough for a self-supporting film. Various other methods have also been reported for preparing functional inorganic layered compound thin films and the like. For instance, there is disclosed a method for manufacturing a clay thin film in which an aqueous dispersion of a hydrotalcite-based interlayer compound is made into a thin film and dried (Japanese Patent Application Laid-open No. H06-95290); a method for manufacturing a clay mineral thin film in which the bond structure of a clay mineral is oriented and fixed through a thermal treatment that promotes a reaction between the clay mineral and phosphoric acid or phosphoric acid groups (Japanese Patent Application Laid-open No. H05-254824); and an aqueous composition for a coating treatment, containing a complex compound of a divalent or higher metal and a smectite-based clay mineral (Japanese Patent Application Laid-open No. 2002-30255), to cite just a few of many such examples.

However, none of the above methods affords an inorganic layered compound oriented self-supporting film having sufficient mechanical strength to be used as a self-supporting film, and being imparted with gas barrier properties according to highly oriented clay particle layers.

In the cosmetic and pharmaceuticals fields, meanwhile, there have been proposed composites of inorganic layered compounds and organic compounds, for example advantageous organic composite clay minerals (for instance, Japanese Patent Application Laid-open No. S63-64913 and Japanese Patent Publication No. H07-17371), or in the manufacture of a drug for treating wet athlete's foot, comprising a mixture of a clay mineral, an acid, and an enzyme (for instance, Japanese Patent Application Laid-open No. S52-15807 and Japanese Patent Publication No. S61-3767). Nevertheless, the fact remains that these organic composite clay minerals have failed thus far to be used as self-supporting films.

Meanwhile, fuel cells, which exploit the inverse reaction of water electrolysis, to generate electricity through a reaction between hydrogen fuel and oxygen from air, are being developed as a next-generation energy source. Herein, there is an urgent demand for solid-polymer fuel cells using hydrogen ion-conductive membranes that afford enhanced ion conductivity and durability at temperatures of about 100° C.

Although various conventional materials have been developed in the fields of packaging materials, sealing materials, display materials, fuel cell materials and the like, no film material has been developed to date that is pliable, highly heat-resistant, water-resistant, and hydrogen ion-conductive, and which has high gas barrier properties and high water-vapor barrier properties. It would be thus highly desirable to develop and to apply in practice, in the present technical field, a novel pliable and highly heat-resistant material in the form of a water-resistant film having sufficient mechanical strength to be used as a self-supporting film.

SUMMARY OF THE INVENTION

Under such circumstances and in light of the above conventional technology, the inventors carried out diligent research directed at developing a novel water-resistant gas-barrier film having sufficient mechanical strength to be used as a self-supporting film, being excellent in flexibility and capable of being used under high-temperature conditions, beyond 200° C. As a result of such research, the inventors found out that a film material having sufficient mechanical strength to be used as a self-supporting film, and boasting gas barrier properties, water resistance, thermal stability and flexibility is obtained by orienting and compactly layering denatured clay crystals, using a denatured clay and, if needed, an additive.

Specifically, the inventors found that an inorganic layered compound film comprising an oriented denatured clay, and exhibiting high water resistance, excellent pliability, excellent gas barrier properties and high heat resistance, is obtained by dispersing in a solvent a denatured clay of high water resistance and, as needed, a small amount of an additive of high water resistance, to obtain thereby a homogeneous dispersion containing no agglomerates, applying thereafter this dispersion onto a support having a flat surface, and separating the solvent according to any of various solid-liquid separating techniques, for example, centrifugation, filtration, vacuum drying, vacuum freeze drying, evaporation by heating or the like to attain thereby formation into a film shape, optionally followed by methods such as drying/heating/cooling or the like to effect thereby detachment from the support.

Based on the above finding, and as a result of further research, the inventors perfected the present invention by discovering, for instance, a preferred denatured clay as well as a suitable additive for the denatured clay, an optimal mixing ratio of the denatured clay and the additive, an optimal solid-liquid ratio for a dispersion, preferred support materials, preferred dispersion methods and the like, whereby the inventors succeeded in enhancing the pliability, water resistance and heat resistance of the film. An object of the present invention is to provide a novel flexible film material having water resistance, excellent thermal stability, and having sufficient mechanical strength to be used as a self-supporting film, by orienting and compactly layering denatured clay crystals.

In order to solve the above problems, the present invention comprises the following technical means.

(1) A film of a material having a denatured clay as a main constituent thereof, comprising 1) a denatured clay and an additive, 2) the weight ratio of the denatured clay is not less than 70% relative to total solids, and having 3) gas barrier properties, and 4) sufficient mechanical strength to be used as a self-supporting film.

(2) The film according to (1), wherein the denatured clay is made of a natural clay or a synthetic clay.

(3) The film according to (1), wherein the clay used in the denatured clay is one or more among mica, vermiculite, montmorillonite, beidellite, saponite, hectorite, stevensite, magadiite, ilerite, kanemite, illite and sericite.

(4) The film according to (1), wherein the denatured clay comprises quaternary ammonium cations or quaternary phosphonium cations, as organic cations.

(5) The film according to (4), wherein an organic cation composition in the denatured clay is less than 30 wt %.

(6) The film according to (4), wherein chlorine concentration is less than 150 ppm.

(7) The film according to any one of (1) to (6), wherein the denatured clay is obtained by reacting a clay with a silylating agent.

(8) The film according to (7), wherein the composition of silylating agent relative to the clay and silylating agent is less than 30 wt %.

(9) The film according to (1), wherein the additive is one or more among celluloid, phenolic resins, alkyd resins, urea resins, cellulose acetate, vinyl acetate resins, acrylic resins, styrene resins, vinyl chloride resins, melamine resins, polyethylene, polyurethane resins, vinylidene chloride resins, polyamide resins, unsaturated polyesters, silicon resins, acrylonitrile-styrene resins, fluororesins, epoxy resins, diallyl phthalate resins, acrylonitrile-butadiene-styrene resins, polyethylene terephthalate, polypropylene, polycarbonate, polyacetal, polyimides, polysulphones, polyphenylene ethers, polybutylene terephthalate, polyethersulfones, liquid crystal polymers, polyphenylene sulfide and polyetherimides.

(10) The film according to (9), wherein the epoxy resin is a lignin-based epoxy resin or a sucrose-based epoxy resin.

(11) The film according to (1), wherein at least 50% of exchangeable ions of the denatured clay are lithium ions.

(12) The film according to (11), wherein the water resistance of the film is enhanced through a thermal treatment.

(13) The film according to (1), wherein the silylated clay is an epoxy-terminated silylated clay, and covalent bonds are formed between clays by an epoxy reaction in a film manufacture process.

(14) The film according to (1), wherein a silylated clay A and a silylated clay B are mixed, and covalent bonds are formed between clays by causing the ends of the silylated clay A to react with the ends of the silylated clay B.

(15) The film according to (14), wherein the ends of the silylated clay A are epoxy groups, and the ends of the silylated clay B are amino groups.

(16) The film according to (1), wherein the film is subjected to a surface treatment.

(17) The film according to (16), wherein the surface treatment is one or more among a water-repellency treatment, a water-proofing treatment, a reinforcement treatment, and a surface flattening treatment.

(18) The film according to (16), wherein the surface treatment comprises forming, on the surface of the film, a silicon oxide film, a fluorine-based film, a silicon-based film, a polysiloxane film, a fluorine-containing organopolysiloxane film, an acrylic resin film, a vinyl chloride resin film, a polyurethane resin film, a high water-repellent plating film, a metallic vapor deposition film, or a carbon vapor deposition film.

(19) The film according to (1), wherein the film is reinforced with a reinforcing material.

(20) The film according to (19), wherein the reinforcing material is one or more selected from the group consisting of mineral fibers, glass wool, carbon fibers, ceramic fibers, plant fibers and organic polymer fibers.

(21) The film according to (19), wherein the reinforcing material has the form of a fabric.

(22) The film according to (21), wherein the fabric is a woven fabric, a nonwoven fabric or paper.

(23) The film according to (19), wherein the weight ratio of the reinforcing material is at most 30% relative to total solids.

(24) The film according to (1), wherein light transmittance, gas barrier properties, water-vapor barrier properties or mechanical strength are improved by forming new chemical bonds within molecules of the additive, between the molecules of the additive, between the additive and an inorganic layered compound, and between inorganic layered compound crystals, through a chemical reaction such as an addition reaction, a condensation reaction or a polymerization reaction, using any method such as heating or light irradiation.

(25) The film according to (1), wherein the thickness of the film is 0.003 mm to 0.3 mm.

(26) The film according to any one of (1) to (25), wherein the film has a permeability coefficient to oxygen gas of less than $2.0 \times 10^{-9}$ $cm^2 s^{-1}$ $cmHg^{-1}$ at room temperature.

(27) The film according to any one of (1) to (26), wherein the water-vapor permeability of the film at 40° C. and 90% relative humidity is less than 10 $gm^{-2}$ $day^{-1}$.

(28) The film according to any one of (1) to (27), wherein the water absorption rate of the film at 20° C. and 65% relative humidity is less than 2%.

(29) The film according to any one of (1) to (28), wherein the film exhibits no visibly observable damage in shape, and has a permeability coefficient to oxygen gas of less than $2.0 \times 10^{-9}$ $cm^2 s^{-1}$ $cmHg^{-1}$ at room temperature, after immersion for 1 hour in superheated water at 150° C.

(30) The film according to any one of (1) to (29), wherein the volume resistivity in a direction perpendicular to the film is at least $2.8 \times 10^{11}$ $\Omega cm$.

(31) The film according to any one of (1) to (30), wherein the ion conductivity in a direction perpendicular to the film is at least $1 \times 10^{-4}$ $Scm^{-1}$.

(32) The film according to any one of (1) to (31), wherein the film is capable of being used without cracking at a bending radius of 8 mm.

(33) The film according to any one of (1) to (32), wherein the film has a 5% weight reduction temperature of 235° C. to 760° C. as measured by thermogravimetry.

(34) The film according to any one of (1) to (33), wherein the average linear thermal expansion coefficient of the film from 50° C. to 250° C. in a direction parallel to the film plane is 5 ppm to 10 ppm.

(35) A multilayer film comprising a film A defined in any one of (1) to (34), and a film B defined in any one of (1) to (34), wherein the constituents of A and B are not the same.

(36) The multilayer film according to (35), wherein the film comprises a film having a non-denatured clay as a main component thereof.

(37) The multilayer film according to (36), wherein the film having a non-denatured clay as a main component thereof 1) is in a weight ratio of at least 70% relative to clay total solids, and 2) has gas barrier properties.

(38) The multilayer film according to (36), wherein the non-denatured clay is a natural or synthetic clay.

(39) The multilayer film according to (36), wherein the non-denatured clay is one or more among mica, vermiculite, montmorillonite, iron montmorillonite, beidellite, saponite, hectorite, stevensite and nontronite.

(40) The multilayer film according to (36), wherein an additive of the film having a non-denatured clay as a main component thereof is one or more among epsilon caprolactam, dextrin, starch, cellulose resins, gelatin, agar, wheat flour, gluten, alkyd resins, polyurethane resins, epoxy resins, fluororesins, acrylic resins, methacrylic resins, phenolic resins, polyamide resins, polyester resins, polyimide resins, polyvinyl resins, polyethylene glycol, polyacrylamide, polyethylene oxide, proteins, deoxyribonucleic acid, ribonucleic acid, polyamino acids, polyhydric phenols and benzoic acid compounds.

(41) The multilayer film according to (35), wherein the weight ratio of the additive is at most 30% relative to total solids.

(42) The multilayer film according to (35), wherein light transmittance, gas barrier properties, water-vapor barrier properties or mechanical strength are improved by forming new chemical bonds within molecules of the additive, between the molecules of the additive, between the additive and an inorganic layered compound, and between inorganic layered compound crystals, through a chemical reaction such as an addition reaction, a condensation reaction or a polymerization reaction, using any method such as heating or light irradiation.

(43) The multilayer film according to (35), wherein the thickness of the multilayer film is 0.003 mm to 0.5 mm.

(44) The multilayer film according to (35), wherein the multilayer film has a permeability coefficient to oxygen gas of less than $2.0\times10^{-9}$ $cm^2s^{-1}$ $cmHg^{-1}$ at room temperature.

(45) The multilayer film according to (35), wherein the water-vapor permeability of the multilayer film at 40° C. and 90% relative humidity is less than 6 $gm^{-2}$ $day^{-1}$.

(46) A composite multilayer film comprising a film defined in any one of (1) to (45), and one or more among a metal foil, a plastic film, rubber and paper.

(47) The composite multilayer film according to (46), comprising, as a plastic film, one or more among polyethylene, polypropylene, polyethylene terephthalate, a polyamide, a fluororesin, an acrylic resin, a polyimide, a polyallylate, a polysulfone and a polyetherimide.

(48) A surface protective film comprising a film defined in any one of (1) to (47).

(49) The surface protective film according to (48), wherein a material to be protected is a metal, a metal oxide, ceramics, plastics, a plastic foamed material, wood, plaster or rubber.

(50) A sealing material, packaging material, protective material, heat insulating material, electric insulating material, heat resistant material, noncombustible material or fuel cell membrane comprising a film defined in any one of (1) to (49).

(51) A method for manufacturing the film defined in (1), comprising the steps of: preparing a denatured clay pre-gel by adding a pre-gel solvent of a denatured clay; adding thereafter a polar solvent; and then adding an additive.

(52) The method for manufacturing the film according to (51), wherein the pre-gel solvent of a denatured clay is water.

(53) The method for manufacturing the film according to (51), wherein the polar solvent is ethanol or dimethylacetamide.

(54) A method for manufacturing the film defined in (34), comprising the step of forming the film defined in any one of (36) to (45) on the surface of the film defined in any one of (1) to (34), or comprising the inverse step thereof.

The present invention is explained in detail next.

The film material of the present invention is a film being a material having a denatured clay as a main constituent thereof, wherein (1) the film comprises a denatured clay and an additive, (2) the weight ratio of the denatured clay is not less than 70% relative to total solids, (3) the film has gas barrier properties, and (4) the film has sufficient mechanical strength to be used as a self-supporting film. In the present invention, a denatured clay film comprising oriented denatured clay crystals, and exhibiting high water resistance, excellent pliability, excellent gas barrier properties and high heat resistance, is obtained by dispersing in a solvent an organic clay of high water resistance and, as needed, a small amount of an additive of high water resistance, to obtain thereby a homogeneous dispersion containing no agglomerates, applying thereafter this dispersion onto a support having a flat surface, and separating the solvent according to a suitable solid-liquid separating technique to attain thereby formation into a film shape, optionally followed by methods such as drying/heating/cooling or the like to effect thereby detachment from the support.

Herein, solid-liquid separation methods include, although not limited thereto, centrifugation, filtration, vacuum drying, vacuum freeze drying, evaporation by heating. In the present invention, there can be arbitrarily set an appropriate denatured clay and additive, an appropriate mixing ratio of the denatured clay and the additive, as well as an appropriate dispersion mixing ratio, support material and dispersion method, all of which allow achieving a film material having enhanced film pliability, water resistance and heat resistance.

Specifically, in the present invention it is important to use a denatured clay of high water resistance and a small amount of an additive having high water resistance, to mold to a flat surface, and to employ such manufacturing conditions that allow reducing to a minimum internal cracks and/or inhomogeneities caused by agglomerates, by orienting and compactly layering the denatured clay, to achieve thereby a film having uniform thickness and sufficient mechanical strength to be used as a self-supporting film. As a result there can be obtained a flexible film, as a self-supporting film, having water resistance, thermal stability and excellent gas barrier properties.

The clay used in the denatured clay of the present invention is a natural or synthetic clay, preferably, for instance, one or more among mica, vermiculite, montmorillonite, beidellite, saponite, hectorite, stevensite, magadiite, ilerite, kanemite, illite and sericite, more preferably, any of such natural or synthetic clays or a mixture thereof. As the organic cation used in the denatured clay employed in the present invention there may be used quaternary ammonium cations or quaternary phosphonium cations. The organic cation composition in the denatured clay may be then less than 30 wt %. In the present invention, the denatured clay may be reacted with a silylating agent. Thereupon, the composition of silylating agent relative to the total weight of clay and silylating agent may be less than 30 wt %.

Examples of the organic compound comprised in the denatured clay of the present invention include, for instance, quaternary ammonium cations or quaternary phosphonium cations. Examples of quaternary ammonium cations, include, though not particularly limited thereto, dimethyl dioctadecyl types, dimethylstearylbenzyl types and trimethyl stearyl types. Quaternary phosphonium cations can be cited as similar organic compounds. These organic compounds can be introduced in the clay through ion exchange with raw-material clay. Such ion exchange can be carried out, for instance, by dispersing raw-material clay in water where there is dissolved a large excess of organic compound, with stirring for a given time, followed by solid-liquid separation through centrifugation or filtration, and repeated washing with water. The ion exchange process may be performed only once, or repeated times. Repeating the ion exchange process has the effect of increasing the rate with which exchangeable ions in the clay, such as sodium, calcium or the like, become replaced by the organic compound. The polarity of the denatured clay can be imparted variation depending on the organic compound used and on the exchange ratio. Denatured clays of differing polarities have also differing preferred additives and solvents. Normally, a quaternary ammonium cation chloride is used as a reagent for introducing quaternary ammonium cations. Although the chlorine mixed in together with the introduced quaternary ammonium can be diluted through washing with water, it is difficult to bring the concentration of such chlorine any lower than 150 ppm, even after repeated water washing. However, chlorine contamination is highly undesirable in, for instance, the field of electronics, and hence the chlorine concentration must often be kept at or below 150 ppm. In such instances, instead of a quaternary ammonium chloride, there must be used a reagent containing no quaternary ammonium chloride, for instance a quaternary ammonium bromide or a quaternary ammonium cation hydroxide.

The silylating agent in the denatured clay of the present invention, although not particularly limited thereto, may be for instance methyltrimethoxysilane, methyltriethoxysilane, propyltrimethoxysilane, butyltrimethoxysilane, hexyltrimethoxysilane, octyltrimethoxysilane, dodecyltrimethoxysilane or octadecyltrimethoxysilane. The method for introducing the silylating agent in the clay is not particularly limited, but may be, for instance, a manufacturing procedure that involves mixing raw-material clay and 2 wt % of silylating agent relative to the raw-material clay, followed by milling of the resulting mixture in a ball mill for 1 hour (Onikata M., Kondo M., Clay Science, 9, 5, 299-310, (1995)).

The additive used in the present invention may be one or more among celluloid, phenolic resins, alkyd resins, urea resins, cellulose acetate, vinyl acetate resins, acrylic resins, styrene resins, vinyl chloride resins, melamine resins, polyethylene, polyurethane resins, vinylidene chloride resins, polyamide resins, unsaturated polyesters, silicon resins, acrylonitrile-styrene resins, fluororesins, epoxy resins, diallyl phthalate resins, acrylonitrile-butadiene-styrene resins, polyethylene terephthalate, polypropylene, polycarbonate, polyacetal, polyimides, polysulphones, polyphenylene ethers, polybutylene terephthalate, polyethersulfones, liquid crystal polymers, polyphenylene sulfide and polyetherimides.

As the epoxy resin there may be used not a petroleum-based resin but a resin of biological origin. This allows reducing the environmental impact of the film. Specifically, there can be used a lignin-based epoxy, or a sucrose-based epoxy.

Interlayer lithium migrates into clay octahedral layers through lithiation of interlayer ions of the clay accompanied by a thermal treatment, thus reducing the interlayer ion component and enhancing water resistance. This enhanced water resistance effect is dramatic when lithium ions represent 50% or more of the interlayer ionic substances. The thermal treatment is ordinarily carried out after film formation, ordinarily at a preferred temperature not lower than 230° C., more preferably at a temperature not lower than 300° C., and optimally, not lower than 350° C. Exceeding 800° C. is undesirable on account of clay degradation. The thermal treatment lasts from 20 minutes to 24 hours. Lower temperatures tend to require longer treatment times.

Various silylating agents are commercially available for preparing a silylated clay. Amongst these there are also silylating agents having reactive functional groups such as epoxy groups, acrylic groups, amino groups, halogen groups and the like. A silylated clay manufactured using a silylating agent having such reactive ends possesses also, as a result, reactive ends, and hence the light transmittance, gas barrier properties, water-vapor barrier properties or mechanical strength of the film can be improved through formation of new chemical bonds by a chemical reaction such as an addition reaction, a condensation reaction, a polymerization reaction or the like induced by a treatment during film formation or after film formation. When the silylated clay has epoxy ends, in particular, there may be formed covalent bonds between clays through an epoxy reaction as a result of a treatment during film formation or after film formation.

Silylated clays having various different reactive ends can be manufactured thus as described above, and hence mixing a silylated clay A having reactive ends with a silylated clay B having other reactive ends, and using this mixture as a raw material for film formation, allows forming chemical bonds between the reactive ends of the clay A and the clay B during film formation or after film formation. Such chemical bonds allow in turn improving the light transmittance, gas barrier properties, water-vapor barrier properties or the mechanical strength of the film. Herein, the ends of the silylated clay A may be epoxy groups, and the ends of the silylated clay B may be amino groups.

Based on a similar approach, there can be manufactured a clay film having preferred characteristics, for instance yet superior mechanical strength and the like, by using organic cations, which are introduced in the clay through exchange with exchangeable inorganic ions between clay layers, the organic cations having themselves also reactive ends, and by causing then chemical bonds to form between the organic cations, or between the organic cations and an additive, through heating or the like, after film formation.

The denatured clay used in the present invention may be readily dispersed in organic solvents. Such additives and the denatured clay are mutually compatible, so that both bond easily to form a composite when mixed in an organic solvent. In a method for manufacturing such a film, firstly there must be prepared a homogeneous dispersion by adding the denatured clay and the additive to an organic solvent. The method for preparing such a dispersion may be a method involving adding the additive after dispersion of the denatured clay, dispersing the denatured clay in a solution comprising the additive, adding simultaneously the denatured clay and the additive to the above dispersion medium to yield a dispersion, or dispersing separately the denatured clay and the additive and then mixing the resulting dispersions. In terms of ease of dispersion, preferably, the denatured clay is dispersed in an organic solvent, followed by addition of the additive, or alternatively, the denatured clay and the additive are dispersed separately, followed by mixing of the respective dispersions.

In this case, firstly the denatured clay is added to the solvent, to prepare a dilute homogeneous denatured clay dispersion. The concentration of the denatured clay in the denatured clay dispersion ranges preferably from 0.3 to 15 wt %, more preferably from 1 to 10 wt %. If the denatured clay concentration is too low, drying may take an excessive time, which is problematic. If the denatured clay concentration is excessive, the denatured clay fails to disperse well, thereby facilitating aggregate formation and precluding achieving a homogeneous film, all of which is problematic. If the denatured clay concentration is excessive, moreover, there may occur problems such as cracks and/or surface roughness due to contraction during drying, as well as uneven film thickness or the like.

Next, the additive or a solution containing the same is weighed and is added to the above denatured clay dispersion, to prepare a homogeneous dispersion comprising the denatured clay and the additive. Herein, both the denatured clay and the additive disperse readily in various organic solvents. Also, the additive and the denatured clay are mutually compatible, and hence bond easily to form a composite when both are mixed in a solvent.

As described above, in the preparation of a clay-additive composite there are ordinarily used a clay that disperses readily in a pure solvent and an additive that dissolves in the same solvent. However, if the solvent in which the clay is dispersed and the solvent in which the additive is dissolved are mutually miscible, there may also be used a mixed solvent. It has been found that the solvent used in the clay dispersion and the solvent in which the additive is dissolved need not be the same. Combinations of such solvents include, for instance, water and methanol, water and ethanol, water and dimethylacetamide, or water and dimethylformamide. Herein, preferably, the denatured clay is firstly expanded with water to prepare a pre-gel, after which there is added thereto a second type of polar solvent.

The amount of organic solvent must be kept as small as possible with a view to achieving a clay film having high heat resistance. For dispersion in an organic solvent, however, there is used ordinarily a clay in which there is introduced about 30 wt % of an organic cation. Normally, such organic clays exhibit a heat resistance not higher than 300° C. In order to manufacture a clay film having superior heat resistance, therefore, there may be used an aqueous dispersion employing a clay having a small organic compound content. On the other hand, using an aqueous additive tends to impair the water resistance of the manufactured clay film. Hence, it is preferable to use an additive that dissolves in a water-miscible polar solvent, to prepare a pre-gel of clay and water and to add then a polar solvent to the pre-gel, followed by addition of the additive, to yield a homogeneous paste.

The weight proportion of additive relative to total solids is less than 30%, preferably of 5% to 20%.

The solvent used is not particularly limited provided that it disperses the denatured clay and dissolves the additive, and may be any solvent among various polar solvents, for instance water, ethyl alcohol, ether, dimethylformamide, tetrahydrofuran, acetone, toluene or the like.

If the proportion of additive is too low, the effect of the latter fails to be brought out during use, while when the proportion of additive is too high, the heat resistance of the obtained film becomes impaired. The dispersion method is not particularly limited provided that it enables as vigorous dispersing as possible. Preferred herein is a method using an agitation apparatus equipped with a stirring blade, a vibrating agitation apparatus, a homomixer or the like, in particular a method using a homomixer on the last dispersion stage, with a view to eliminating small agglomerates. When agglomerates are present in the dispersion they may give rise to film surface roughness or film texture unevenness.

In the film of the present invention there may be added a weight of a reinforcing material, as the case may require, to a denatured clay dispersion, to prepare a homogeneous dispersion. As the reinforcing material there may be used one or more among mineral fibers, glass wool, carbon fibers, ceramic fibers, plant fibers and organic polymer fiber resins. The reinforcing material may be used in the form of a fabric of such fibers. The fabric may be woven or nonwoven. A reinforcing material fabric may be used not mixed with a dispersion but in an operation where the fabric is affixed onto a support, the support being then coated from above with a dispersion. The weight proportion of reinforcing material relative to total solids is less than 30%, preferably of 1% to 10%. If the proportion of reinforcing material is too low, the effect of adding the latter fails to be brought out, while when the proportion of reinforcing material is too high, the distribution of reinforcing material and clay in the manufactured film becomes uneven, thus thwarting the effect of adding the reinforcing material by reducing eventually the homogeneity of the obtained clay film. There is no established addition sequence of the reinforcing material and the additive, and either may be added first.

Next, the dispersion is deaerated, as the case may require. The deaeration method includes vacuum evacuation, heating, centrifuging or the like, but is preferably a method comprising vacuum evacuation. The deaerated dispersion is applied then onto a support surface to a constant thickness. The dispersion medium liquid is evaporated then slowly, to yield a film-shaped remnant. The method for drying the composite inorganic layered compound film thus formed may involve, for instance, any method among centrifugation, filtration, vacuum drying, vacuum freeze drying and evaporation by heating, or a combination thereof.

When for instance evaporation by heating is employed among the above methods, the dispersion is applied onto a support such as a flat tray, for instance a tray of brass, polypropylene, Teflon™ or the like. The support is then placed, while kept horizontal, in a forced draft oven, where it is dried under temperature conditions of 30 to 90° C., preferably of 30 to 50° C., for about 10 minutes to 3 hours, preferably for about 20 minutes to 1 hour, to yield an additive-composite organic clay film.

If the support lacks sufficient releasability from the film material, the film becomes adhered to the support, being detached therefrom only with difficulty, which is problematic. The support surface may be subjected to various surface treatments with a view to improving releasability. The treatment may involve, for instance, providing a fluorine-based film over a metallic material. Preferably, the support surface is as flat as possible. If the support surface is not flat, the support surface irregularities are transferred to the film surface, where they detract from the smoothness of the film surface.

If the dispersion is not deaerated beforehand, the obtained composite inorganic layered compound film is likely to exhibit holes resulting from air bubbles, which may be problematic. Air bubbles trapped in the composite denatured clay film are problematic since, in addition to reducing film homogeneity, they give rise to internal scattering of light, which results in film clouding. The drying conditions are set in such a way that the liquid component is sufficiently removed through evaporation. Too low a temperature is problematic herein in that drying requires more time. An excessively high temperature is also problematic in that it causes dispersion convection, as a result of which the thickness of the film becomes uneven, with a reduced degree of orientation of the denatured clay particles.

The film of the present invention can be obtained to an arbitrary thickness by increasing or reducing the weight of solids used in the dispersion. As regards thickness, forming a thinner film tends to afford excellent surface smoothness. On the other hand, a thicker film reduces pliability, which is problematic. Preferably, thus, the thickness of the film is not greater than 0.2 mm.

In the present invention, imparting high orientation to a stack of denatured clay particles refers to layering unit constituent layers (having each a thickness of about 1 nm to 1.5 nm) of the denatured clay particles to a same layer surface orientation, thus imparting high periodicity in the perpendicular direction to the layer surface. In order to obtain such orientation of the denatured clay particles, it is important that the denatured clay particles be compactly layered when made to form a film shape by coating a support with a diluted homogeneous dispersion comprising the denatured clay and the additive, and by evaporating slowly the liquid dispersion medium.

Suitable manufacturing conditions for the above film formation include a concentration of the denatured clay in the denatured clay dispersion ranging preferably from 0.3 to 15 wt %, more preferably from 1 to 10 wt %, while the drying conditions in a heat drying method include drying under temperature conditions of room temperature to 90° C., more preferably of 30 to 50° C., for about 10 minutes to 3 hours, more preferably for about 20 minutes to 1 hour.

When the additive-composite denatured clay film does not detach by itself from the support, a self-supporting film is obtained, preferably, by detaching easily the film through drying, for instance, under temperature conditions of about 80° C. to 200° C. 1 hour of drying is sufficient. Too low a temperature is problematic in that detachment becomes harder to achieve. When the temperature is excessively high, the additive degrades, thus giving rise to various problems such as film coloring, loss of mechanical strength, and impaired gas barrier properties.

Treating the surface of the denatured clay film of the present invention allows modifying the surface characteristic, enhancing water resistance/high moisture-blocking properties. The surface treatment is not particularly limited provided that it yields a homogeneous surface, and may involve, for instance, formation of a cover layer.

Such cover layer formation methods involve forming, on the surface of the film, for instance a fluorine-based film, a silicon-based film, a polysiloxane film, a fluorine-containing organopolysiloxane film, an acrylic resin film, a vinyl chloride resin film, a polyurethane resin film, a high water-repellent plating film, a metallic vapor deposition film, or a carbon vapor deposition film. Film formation may be achieved herein, for instance, by a wet process, a dry process, vapor deposition, spraying or the like. The cover layer formed on the surface of the film is hydrophobic, which as a result allows conferring water repellency to the denatured clay film surface. Such a treatment may be carried out on only one face of the clay film, or on both faces, in accordance with the intended application. Other surface treatments for surface reformation include, for instance, chemical treatments such as silylation, ion exchange and the like.

In addition to the above water repellency and enhanced water resistance, such a surface treatment may also afford a reinforcing effect, by increasing film strength, as well as other effects such as suppressing surface light scattering, imparting gloss, making the appearance of the film more attractive, and flattening the film surface, thus increasing transparency. When an organic polymer is used as a cover layer, the habitual temperature range of the clay film may be constrained by the habitual temperature range of the material of the cover layer. Depending on the intended application, therefore, the material employed for the surface treatment, and the resulting film thickness, are selected carefully.

The clay film itself of the present invention uses a denatured clay as a main raw material (70 wt % upwards). A preferred basic constitution of the clay film includes, for instance, a layer thickness of about 1 to 2 nm, a particle size of up to 5 μm, and up to 30 wt % of an additive of a natural or synthetic low molecular compound/polymer having a molecule size of up to several nm. The clay film is manufactured, for instance, by layering compactly denatured clay layer-like crystals having a thickness of about 1 to 1.5 nm and oriented to a same orientation.

The obtained film has a thickness of 3 to 100 μm, preferably of 3 to 80 μm and an oxygen gas permeability coefficient of less than $1.28 \times 10^{-9}$ $cm^2 s^{-1}$ $cmHg^{-1}$ at room temperature. Also, the film can be formed to a large surface area of 100×40 cm or more, has high heat resistance, exhibits no impaired gas barrier properties even after 1 hour of thermal treatment at 150° C., has high water resistance, exhibiting no impaired gas barrier properties even after 1 hour of immersion in water at room temperature, has high hot water resistance, exhibiting no impaired gas barrier properties even after 1 hour of immersion in water at 150° C., and exhibits a volume resistivity in the perpendicular direction to the film of 10 MΩ or higher.

Thus, the denatured clay film of the present invention, in which a stack of the denatured clay particles is highly oriented, can be used as a self-supporting film, has excellent flexibility, is devoid of pinholes, and retains its barrier properties against gases and liquids even at high temperatures up to 150° C. Also, the denatured clay film of the present invention can be easily cut to an arbitrary shape or size, for instance a circular, square or rectangular shape, using scissors, a cutter or the like.

According to its electric insulating properties, the denatured clay film of the present invention can be widely used as an electric insulating film. Moreover, according to its ionic conductivity, the denatured clay film of the present invention can be widely used as a fuel cell membrane.

Accordingly, the denatured clay film of the present invention can be used in a wide variety of applications as a self-supporting film having excellent flexibility, gas barrier properties and water-vapor barrier properties under high-temperature conditions. The denatured clay film can also be used, for instance, as a pliable packaging material/sealing material/insulating material/fuel cell membrane material that is chemically stable and that preserves its water resistance even at a high temperature beyond 150° C. A thin film excellent in flexibility, strength and water resistance is obtained through the interaction between the additive and the denatured clay. This prevents as a result the denatured clay thin film from breaking easily through stretching, twisting or the like. The denatured clay film has thus excellent characteristics that enable it to be used as a self-supporting film.

The denatured clay film of the present invention can be used, for instance, as an LCD substrate film, an organic EL substrate film, an electronic paper substrate film, an electronic device encapsulating film, a PDP film, an LED film, an optical communication member, a substrate film for various functional films, an IC tag film, a flexible film for other kinds of electronic device, a fuel cell sealing film, a solar battery film, a food packaging film, a beverage packaging film, a medicinal-product packaging film, a packaging film for daily necessities, a packaging film for industrial articles, and as a packaging film for other various articles. The denatured clay film of the present invention can be widely used as a gas-barrier sealing material against gaseous species such as carbon dioxide and hydrogen.

Multi-layering is an example in which the above denatured clay film is bonded to another member. That is, gas barrier properties, water-vapor barrier properties and mechanical strength can be enhanced by making a denatured clay composite film into a multilayer film together with a film B manufactured out of other materials. An example thereof is a multilayer film obtained by bonding a denatured clay composite film with, for instance, a polyethylene film, a polyethylene terephthalate film or a fluororesin film, which are kinds of plastic film, using an adhesive agent.

Fluororesin films have low moisture permeability, and hence a multilayer film of a fluororesin film and a denatured clay composite film can be used as a film having high moisture-blocking properties and high gas barrier properties. The material of the film B is no particularly limited provided that the multilayer film thereof and a clay film has good moldability, and may be, preferably, for instance a metal foil, thin-sheet glass, various plastic films, paper, rubber or the like. Herein there may be used similarly a multilayer film having three or more layers comprising a denatured clay composite film. As the material of the film B there may be used a film having a non-denatured clay as a main component and having excellent oxygen gas barrier properties. The denatured clay film has excellent water-vapor barrier properties, while a film having a non-denatured clay as a main component has excellent dry gas barrier properties and heat resistance. Therefore, a multilayer film of the foregoing boasts both excellent oxygen-gas barrier properties and water-vapor barrier properties. The method for manufacturing the multilayer film may comprise forming a non-denatured clay film on a denatured clay film, or, conversely, forming a denatured clay film on a non-denatured clay film.

The denatured clay film of the present invention has a semi-transparent appearance. Thin-sheet glass is a transparent heat-resistant film, but at most, its thinness is limited to about 0.4 mm. By contrast, the denatured clay composite film of the present invention can be manufactured to be very thin, from about 0.1 mm to about 3 μm, contributing thus to making the device as a whole flexible as well as lightweight. Film flexibility is an important characteristic in a flexible device material and/or an electronic device encapsulating material. The denatured clay film of the present invention does not crack or the like even when bent to a radius of 8 mm, and can be used thus in a wide range of flexible devices. Moreover, due to its ionic conductivity, the denatured clay film of the present invention can be widely used in fuel cell membranes.

The film of the present invention has excellent flexibility and processability, and hence can arguably be used also in a roll-to-roll process. The film of the present invention has a silicate as a main component and is hence more resistant to radiation than plastic materials, being thus a potential packaging material for medicinal products that involve radiation sterilization using gamma rays, electron beams or the like. The film of the present invention bonds easily with other materials. Herein, there can be used ordinary adhesive agents and/or surface coating, while gas barrier properties, water-vapor barrier properties, water resistance, heat resistance and flame resistance can be enhanced through surface coating and laminating. A multilayer film may comprise herein a denatured clay film of the present invention and a metal foil, a plastic film, paper or the like. Examples of a plastic film include, for instance, polyethylene, polypropylene, polyethylene terephthalate, a polyamide, a fluororesin, an acrylic resin or a polyimide. Examples of a surface-coated material include, for instance, metals, metal oxides, ceramics, plastics, plastic foamed materials, wood, plaster boards, rubber or the like. Through surface coating of the denatured clay of the present invention there can be enhanced, for instance, oxidation resistance, corrosion resistance, weatherability, gas barrier properties, water-vapor barrier properties, water resistance, heat resistance, chemical resistance, flame-proofness and the like.

Conventional high gas-barrier materials, for instance thin-sheet glass or metal foils, and articles thereof, are problematic in that they fail to meet all the requirements of pliability, heat resistance, light weight, electric insulating properties and internal visibility, and hence their scope of application is limited. In the present invention, by contrast, there is used a film material having as a main constituent thereof a denatured clay having a structure in which the layering of denatured clay particles is highly oriented. As a result, the present invention allows manufacturing and providing a novel film material that meets all the requirements of gas barrier properties, water-vapor barrier properties, pliability, heat resistance, electric insulating properties, internal visibility and light weight.

The present invention affords the following distinctive effects:

(1) The invention allows providing a film material comprising a denatured clay in which denatured clay particles are evenly oriented.

(2) The film material comprising such a denatured clay can be used as a self-supporting film, and possesses chemical stability and gas barrier properties even at high temperatures beyond 150° C.

(3) The invention allows providing a novel film material that satisfies all the requirements of gas barrier properties, water-vapor barrier properties, pliability, heat resistance, light weight, electric insulating properties and water resistance.

(4) The invention yields a semi-transparent film material that enables internal visibility.

(5) The film material of the present invention can be suitably used as, for instance, a pliable gas sealing material, packaging material, sealing material, electric insulating material or the like.

(6) The film material of the present invention can be widely used as a multilayer film by being applied onto the surface of, for instance, metals, plastics, rubber, paper, ceramics and the like.

(7) The film material of the present invention can be widely used as a surface protective film by being applied onto the surface of, for instance, metals, metal oxides, ceramics, plastics, plastic foamed products, wood, plaster boards, rubber and the like.

(8) The film material of the present invention can be suitably used, for instance, as a membrane for fuel cells.

DESCRIPTION OF THE PREFERRED EMBODIMENTS

Figure 1:
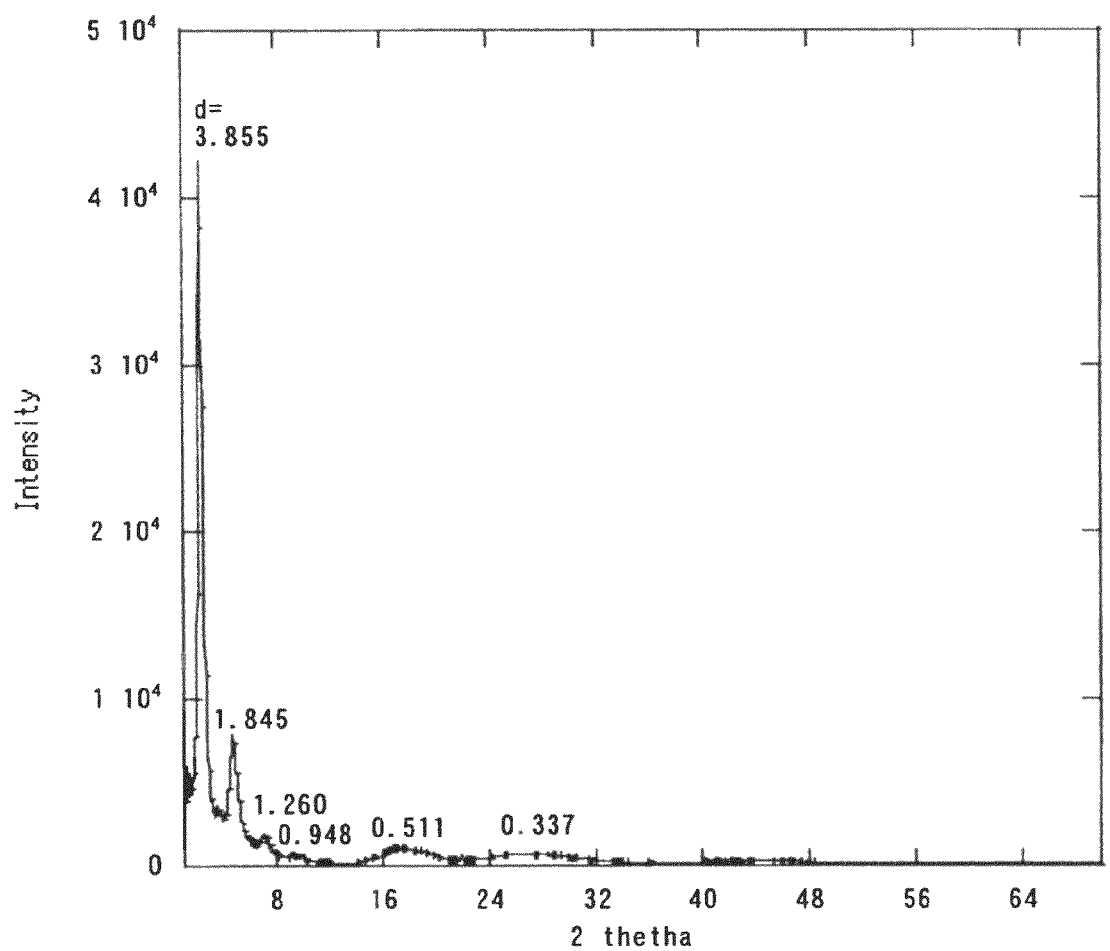
FIG. 1 is a diagram illustrating an X-ray diffraction chart of a composite denatured clay thin film of the present invention prepared using a denatured clay and an epoxy resin, in which the weight ratio of the used epoxy resin relative to total solids was of 30% for WR30-60, and of 0% for WR0-40.

The present invention is explained below based on examples. However, the invention is in no way meant to be limited to or by such examples.

Example 1

(1) Manufacture of a Denatured Clay Thin Film

A commercially available product (by Hojun Co., Ltd.) in which a dimethylstearylbenzyl-type quaternary ammonium ions, and trimethoxysilane as a silylating agent, are introduced in natural bentonite, was used as a denatured clay. The denatured clay was added, in an amount of 14 g, to 440 cm$^3$ of toluene, then the whole was placed, together with a Teflon™ rotor, in a plastic sealed container, followed by vigorous shaking for 2 hours at 25° C. to yield a homogeneous dispersion. The dispersion was divided into two, and then to each half there were added, respectively, 3 g of an epoxy resin (agent A) of a commercially available epoxy-based adhesive agent (by Konishi Co., Ltd.), and a denatured polyamide (agent B), followed by vigorous shaking to yield homogeneous dispersions. The two dispersions were mixed next, followed by further vigorous shaking for 20 minutes at 25° C. to yield a homogeneous clay paste.

This clay paste was deaerated next in a vacuum defoaming apparatus. The clay paste was then applied onto a metal plate having bonded thereto a 0.1-mm thick Teflon™ film. A ground spatula made of stainless steel was used to apply the clay paste. Using a 4-mm high spacer as a guide there was molded a clay paste film having a uniform thickness. The tray was left to dry naturally at room temperature, to yield a uniform denatured clay thin film having a thickness of about 60 μm. After standing for 24 hours, the denatured clay film was detached from the tray, to yield a self-supporting film (WR30-60) having excellent flexibility.

(2) Characteristics of the Denatured Clay Thin Film

The pliability of the film was measured using a mandrel bend tester (ISO1519). WR30-60 exhibited no defects such as cracks or the like even when bent to a radius of 6 mm. The oxygen permeability coefficient of the film was measured using a Gasperm-100 device, from Jasco Corp. As a result there was obtained an oxygen gas permeability coefficient of less than $1.28 \times 10^{-9}$ $cm^2 s^{-1}$ $cmHg^{-1}$ at room temperature, which indicated high gas barrier performance. The water-vapor permeability (JIS Z0208-1976) of the film at 40° C. and 90% relative humidity was of 2.15 g/m²/day as measured by a cup method. The perpendicular-direction DC electric resistance of WR30-60 was not less than 1 MΩ, as measured by an AC two-probe method. The permittivity at 1 MHz of a film WR30-40 having a thickness of 40 μm and manufactured in the same way was of 3.34. A volume resistivity measurement yielded a result of $2.15 \times 10^{13}$ Ωcm.

The ionic conductivity of WR30-60 was measured as described below. Specifically, conductivity was measured based on an AC impedance measurement in accordance with a single sine wave measurement method, using an own-made cell (made of Teflon™). A film sample was sandwiched between two Teflon™ blocks having 5×10 mm holes opened thereon, the two ends of the film were connected to platinum foil, and then the AC impedance of the film, for an AC voltage amplitude of 0.02 V and a frequency of 0.001 to 106 Hz, was measured in a wet condition using a frequency response analyzer. The measured ionic conductivity was of $1 \times 10^{-4}$ S $cm^{-1}$.

The chemical resistance of a 40-μm thick film manufactured in the same way was also evaluated. The results of a chemical resistance test in accordance with JIS K6258-1993 (weight change after immersion for 72 hours at 40° C.) against distilled water, brine (10 wt % NaCl), an alkali (1 wt % NaOH), toluene, acetone, ethyl acetate and ethanol were 17%, 3%, 39%, 44%, 32%, 25% and 6%, respectively.

(3) Structure of the Denatured Clay Thin Film

FIG. 1 illustrates an X-ray diffraction chart of WR30-60. In the X-ray diffraction chart there was observed an extremely sharp base reflection peak 001 at d=3.855 nm. Other sharp high-order reflection peaks were observed, for instance, at d=1.845(002), d=1.260(003), d=0.948(004), which indicate that layering of the clay layer-like crystals in WR30-60 is highly oriented.

Figure 2:
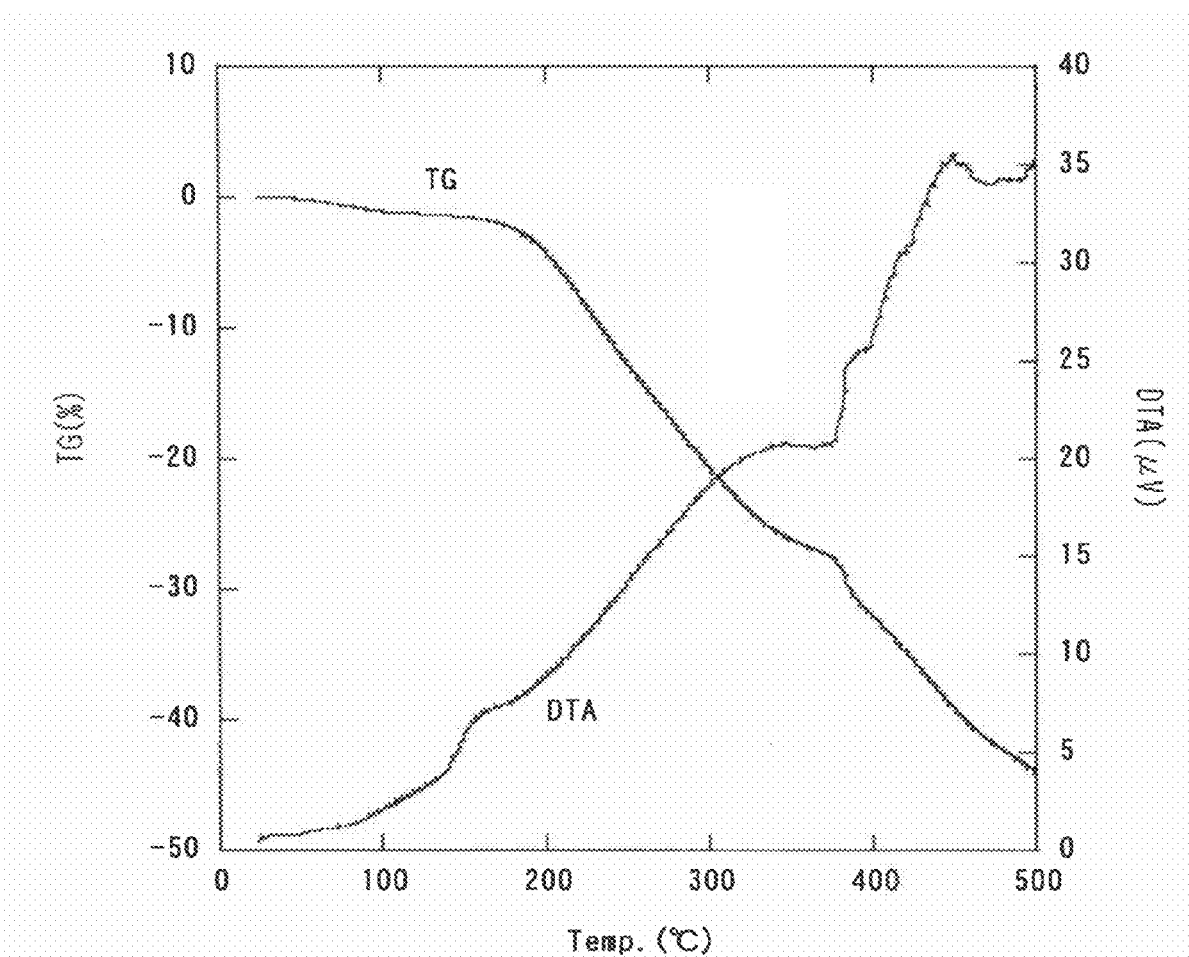
FIG. 2 is a diagram illustrating a TG-DTA chart of a composite denatured clay thin film of the present invention prepared using a denatured clay and an epoxy resin, in which the weight ratio of the used epoxy resin relative to total solids was of 30% for WR30-60, and of 0% for WR0-40.

WR30-60 was subjected to a thermal analysis (temperature rise rate: 5° C./minute, under an ordinary air flow atmosphere). From the TG curve there was observed a weight reduction of about 1.5% through elimination of adsorbed water, from room temperature to 150° C., and a further weight reduction of about 42%, from 170° C. to 500° C. arising from the thermal decomposition of organic compounds (FIG. 2). The 5% weight reduction temperature was 235° C.

Figure 3:
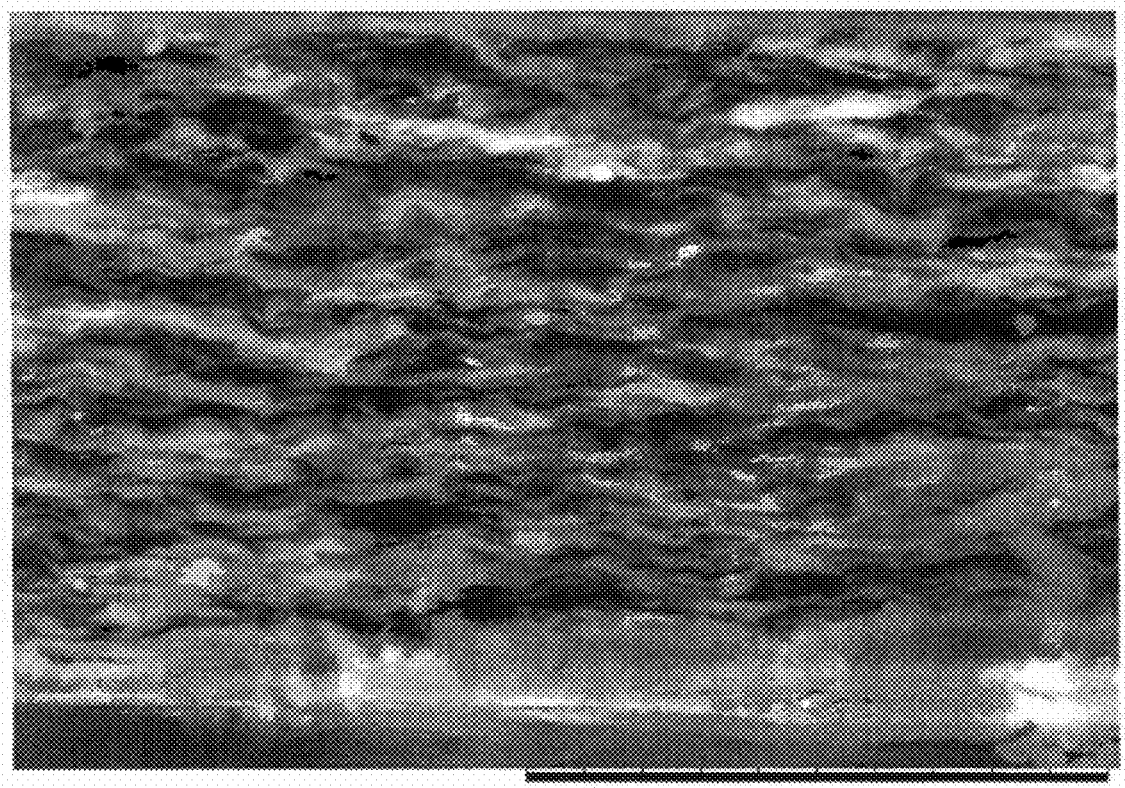
FIG. 3 is a diagram illustrating a scanning electron micrograph of a composite denatured clay thin film WR30-60 prepared using a denatured clay and an epoxy resin, at 5000 magnifications, and in which the weight ratio of the used epoxy resin relative to total solids was of 30%.

FIG. 3 illustrates a scanning electron micrograph of a cross section of WR30-60. The micrograph indicates that the plate-like crystals of the denatured clay have a structure in which layers are stacked oriented parallel to the film. Such a structure is thought to impart flexibility and gas barrier properties to the film.

(4) Heat Resistance of the Denatured Clay Thin Film

WR30-60 was heated in an electric oven, where the temperature was raised from room temperature to 150° C. over about 20 minutes. The temperature was then kept at 150° C. for 1 hour, and then the denatured clay thin film was left to cool in the electric oven. After the above thermal treatment, no anomalies such as pinholes, cracks or the like or the like were observable to the naked eye. The oxygen permeability coefficient of the film was measured using a Gasperm-100 device, from Jasco Corp. As a result there was obtained an oxygen gas permeability coefficient of less than $1.28 \times 10^{-9}$ $cm^2 s^{-1}$ $cmHg^{-1}$ at room temperature, which indicated high gas barrier performance.

(5) Water Resistance of the Denatured Clay Thin Film

WR30-60 was immersed in distilled water for 1 hour. After that treatment, no anomalies such as pinholes, cracks or the like or the like were observable to the naked eye. The oxygen permeability coefficient of the film was measured using a Gasperm-100 device, from Jasco Corp. As a result there was obtained an oxygen gas permeability coefficient of less than $1.28 \times 10^{-9}$ $cm^2 s^{-1}$ $cmHg^{-1}$ at room temperature, which indicated high gas barrier performance.

(6) Hot Water Resistance of the Denatured Clay Thin Film

WR30-60 was charged in an autoclave and then distilled water was poured therein to immerse WR30-60 in distilled water. The autoclave was placed in an electric oven, where it was heated. The temperature was raised from room temperature to 150° C. over about 20 minutes. The temperature was then kept at 150° C. for 1 hour, and then the denatured clay thin film was left to cool in the electric oven, followed by 1 hour of immersion in distilled water. After that treatment, no anomalies such as pinholes, cracks or the like or the like were observable to the naked eye. The oxygen permeability coefficient of the film was measured using a Gasperm-100 device, from Jasco Corp. As a result there was obtained an oxygen gas permeability coefficient of less than $1.28 \times 10^{-9}$ $cm^2 s^{-1}$ $cmHg^{-1}$ at room temperature, which indicated high gas barrier performance. The total transmissivity of WR30-60 was of 89.3%, and the haze 31.2%, based on JIS K7105.

Comparative Example 1

(1) Manufacture of a Clay Thin Film

Natural montmorillonite (Kunipia P, by Kunimine Industries, Inc.), in an amount of 2.7 g, and synthetic mica (Somasif ME-100, by Co-op Chemical Co., Ltd.) in an amount of 0.72 g were added, as clays, to 100 cm³ of distilled water, then the whole was placed, together with a Teflon™ rotor, in a plastic sealed container, followed by vigorous shaking for 2 hours at 25° C. to yield a homogeneous dispersion. To this dispersion there was added, as an additive, 0.18 g of a methyl vinyl ether/maleic anhydride copolymer (by Daicel Chemical Industries, Ltd.), followed by vigorous shaking, to yield a homogeneous dispersion comprising natural montmorillonite and methyl vinyl ether/maleic anhydride copolymer. This dispersion was dried gradually to yield a clay paste. This clay paste was deaerated next in a vacuum defoaming apparatus. The clay paste was then applied onto a brass plate. A ground spatula made of stainless steel was used to apply the clay paste. Using a spacer as a guide there was molded a clay paste film having a uniform thickness. The thickness of the paste was 2 mm. The tray was placed in a forced draft oven and was dried for 1 hour under temperature conditions of 60° C., to yield a homogeneous additive-composite clay film having a thickness of about 40 μm. The formed clay film was detached from the tray, to yield a self-supporting clay film (HR) having excellent flexibility.

(2) Characteristics of the Clay Thin Film

Upon immersion in distilled water for 1 hour, the clay comprised in the HR film re-dispersed in water, whereby the film shape was lost. The water-vapor permeability (JIS Z0208-1976) of the film at 40° C. and 90% relative humidity was of 71.9 g/m$^2$/day as measured by a cup method.

Example 2

(1) Manufacture of a Denatured Clay Thin Film

A commercially available product (by Hojun Co. Ltd.) in which a dimethylstearylbenzyl-type quaternary ammonium ions, and trimethoxysilane as a silylating agent, are introduced in natural bentonite, was used as a denatured clay. The denatured clay was added, in an amount of 14 g, to 440 cm$^3$ of toluene, then the whole was placed, together with a Teflon™ rotor, in a plastic sealed container, followed by vigorous shaking for 2 hours at 25° C. to yield a homogeneous dispersion. The dispersion was divided into two, and then to each half there were added 3 g of an epoxy resin (agent A) of a commercially available epoxy-based adhesive agent (by Konishi Co., Ltd.), and a denatured polyamide (agent B), followed by vigorous shaking to yield homogeneous dispersions. The two dispersions were mixed next, followed by further vigorous shaking for 20 minutes at 25° C. to yield a homogeneous clay paste.

This clay paste was deaerated next in a vacuum defoaming apparatus. The clay paste was then applied onto a metal plate having bonded thereto a 0.1 mm-thick Teflon™ film. A ground spatula made of stainless steel was used to apply the clay paste. Using a 2 mm-high spacer as a guide there was molded a clay paste film having a uniform thickness. The tray was left to dry naturally at room temperature, to yield a uniform denatured clay thin film having a thickness of about 30 μm. After standing for 24 hours, the denatured clay film was detached from the tray, to yield a self-supporting film (WR30-30) having excellent flexibility.

Example 3

(1) Manufacture of a Denatured Clay

Kunipia P (by Kunimine Industries, Inc.), which is a natural purified bentonite, was dispersed, in an amount of 60 g, in 600 cm$^3$ of distilled water. The resulting dispersion was then mixed with 60 g of a commercially available tetrabutylammonium bromide special reagent, followed by shaking and stirring for 2 hours at 25° C., to prepare a homogeneous dispersion. This dispersion was subjected to solid-liquid separation in a centrifuge at 6000 rpm for 10 minutes, followed by further mixing over 20 minutes using a homomixer. The obtained solid was washed with water, was dried and crushed to prepare thereby a denatured clay.

(2) Manufacture of a Denatured Clay Thin Film

The manufactured denatured clay was added, in an amount of 19.2 g, to 665 cm$^3$ of toluene, then the whole was placed, together with a Teflon™ rotor, in a plastic sealed container, followed by vigorous shaking for 2 hours at 25° C. to yield a homogeneous clay paste. This clay paste was deaerated next in a vacuum defoaming apparatus. The clay paste was then applied onto a metal plate having bonded thereto a 0.1 mm-thick Teflon™ film. A ground spatula made of stainless steel was used to apply the clay paste. Using a spacer as a guide there was molded a clay paste film having a uniform thickness. The tray was left to dry naturally at room temperature, to yield a uniform denatured clay thin film having a thickness of about 60 μm. After standing for 24 hours, the denatured clay film was detached from the tray, to yield a self-supporting film (WRCF0-60) having excellent flexibility. WRCF0-60 exhibited no defects, such as cracks or the like, even when bent to a 2 mm radius.

Example 4

(1) Manufacture of a Denatured Clay

Kunipia P (by Kunimine Industries, Inc.), which is a natural purified bentonite, was dispersed, in an amount of 60 g, in 600 cm$^3$ of distilled water. The resulting dispersion was then mixed with 60 g of a commercially available tetrabutylammonium bromide special reagent, followed by shaking and stirring for 2 hours at 25° C., to prepare a homogeneous dispersion. This dispersion was subjected to solid-liquid separation in a centrifuge at 6000 rpm for 10 minutes, followed by further mixing over 20 minutes using a homomixer. The obtained solid was washed with water, was dried and crushed to prepare thereby a denatured clay. The chlorine concentration of this denatured clay was not greater than 150 ppm.

(2) Manufacture of a Denatured Clay Thin Film

The manufactured denatured clay was added, in an amount of 19.2 g, to 665 cm$^3$ of toluene, then the whole was placed, together with a Teflon™ rotor, in a plastic sealed container, followed by vigorous shaking for 2 hours at 25° C. to yield a homogeneous dispersion. The dispersion was divided into two, and then to each half there were added 2.4 g of an epoxy resin (agent A) of a commercially available epoxy-based adhesive agent (by Konishi Co., Ltd.), and a denatured polyamide (agent B), followed by vigorous shaking to yield homogeneous dispersions. The two dispersions were mixed next, followed by further vigorous shaking for 20 minutes at 25° C. to yield a homogeneous clay paste. This clay paste was deaerated next in a vacuum defoaming apparatus. The clay paste was then applied onto a metal plate having bonded thereto a 0.1 mm-thick Teflon™ film. A ground spatula made of stainless steel was used to apply the clay paste. Using a spacer as a guide there was molded a clay paste film having a uniform thickness. The tray was left to dry naturally at room temperature, to yield a uniform denatured clay thin film having a thickness of about 50 μm. After standing for 24 hours, the denatured clay film was detached from the tray, to yield a self-supporting film (WRCF20-50) having excellent flexibility. WRCF20-50 exhibited no defects, such as cracks or the like, even when bent to a 2 mm radius.

Example 5

(1) Manufacture of a Denatured Clay Thin Film

A commercially available product (by Hojun Co. Ltd.) in which a dimethylstearylbenzyl-type quaternary ammonium ions, and trimethoxysilane as a silylating agent, are introduced in natural bentonite, was used as a denatured clay. The denatured clay was added, in an amount of 14 g, to 440 cm$^3$ of toluene, then the whole was placed, together with a Teflon™ rotor, in a plastic sealed container, followed by vigorous shaking for 2 hours at 25° C. to yield a homogeneous dispersion. The dispersion was divided into two, and then to each half there were added 3 g of an epoxy resin (agent A) of a commercially available epoxy-based adhesive agent (by Konishi Co., Ltd.), and a denatured polyamide (agent B), followed by vigorous shaking to yield homogeneous dispersions. The two dispersions were mixed next, followed by further vigorous shaking for 20 minutes at 25° C. to yield a homogeneous clay paste.

This clay paste was deaerated next in a vacuum defoaming apparatus. The clay paste was then applied onto the adhesive-layer side of a commercially available 50-μm thick fluororesin adhesive sheet that was kept in horizontal position. A ground spatula made of stainless steel was used to apply the clay paste. Using a 4 mm-high spacer as a guide there was molded a clay paste film having a uniform thickness. The film was left to dry naturally at room temperature, to yield a multilayer film (DL30) of the fluororesin film comprising a uniform denatured clay thin film having a thickness of about 60 μm.

(2) Characteristics of the Denatured Clay Multilayer Film

The pliability of the film was measured using a mandrel bend tester (ISO1519). DL30 exhibited no defects such as cracks or the like even when bent to a radius of 6 mm. The oxygen permeability coefficient of the film was measured using a Gasperm-100 device, from Jasco Corp. As a result there was obtained an oxygen gas permeability coefficient of less than $1.28 \times 10^{-9}$ $cm^2$ $s^{-1}$ $cmHg^{-1}$ at room temperature, which indicated high gas barrier performance. For evaluating the adhesion of the denatured clay layer, a 1-mm/25-square cross-cut test based on JIS K5600 was carried out. No stripping of the denatured clay layer was observed.

Example 6

(1) Manufacture of a Denatured Clay Thin Film

A commercially available product (by Hojun Co. Ltd.) in which a dimethylstearylbenzyl-type quaternary ammonium ions, and trimethoxysilane as a silylating agent, are introduced in natural bentonite, was used as a denatured clay. The denatured clay was added, in an amount of 14 g, to 440 $cm^3$ of toluene, then the whole was placed, together with a Teflon™ rotor, in a plastic sealed container, followed by vigorous shaking for 2 hours at 25° C. to yield a homogeneous dispersion. The dispersion was divided into two, and then to each half there were added 3 g of an epoxy resin (agent A) of a commercially available epoxy-based adhesive agent (by Konishi Co., Ltd.), and a denatured polyamide (agent B), followed by vigorous shaking to yield homogeneous dispersions. The two dispersions were mixed next, followed by further vigorous shaking for 20 minutes at 25° C. to yield a homogeneous clay paste.

This clay paste was deaerated next in a vacuum defoaming apparatus. The clay paste was then applied onto the adhesive-layer side of a commercially available 50-μm thick fluororesin adhesive sheet that was kept in horizontal position. A ground spatula made of stainless steel was used to apply the clay paste. Using a 4 mm-high spacer as a guide there was molded a clay paste film having a uniform thickness. The film was left to dry naturally at room temperature, to yield a multilayer film (DL30) of the fluororesin film comprising a uniform denatured clay thin film having a thickness of about 60 μm. Then a 50-μm thick commercially available fluororesin adhesive sheet was bonded to the denatured clay side of DL30, to yield a multilayer film (TL30).

(2) Characteristics of the Denatured Clay Multilayer Film

The pliability of the film was measured using a mandrel bend tester (ISO1519). TL30 exhibited no defects such as cracks or the like even when bent to a radius of 6 mm. The oxygen permeability coefficient of the film was measured using a Gasperm-100 device, from Jasco Corp. As a result there was obtained an oxygen gas permeability coefficient of less than $1.28 \times 10^{-9}$ $cm^2 s^{-1}$ $cmHg^{-1}$ at room temperature, which indicated high gas barrier performance. The water-vapor permeability (JIS Z0208-1976) of the film was of 0.6 $g/m^2/day$ as measured by a cup method.

Example 7

(1) Manufacture of a Fiber-Reinforced Denatured Clay Thin Film

A commercially available product (by Hojun Co. Ltd.) in which a dimethylstearylbenzyl-type quaternary ammonium ions, and trimethoxysilane as a silylating agent, are introduced in natural bentonite, was used as a denatured clay. The denatured clay was added, in an amount of 14 g, to 440 $cm^3$ of toluene, then the whole was placed, together with a Teflon™ rotor, in a plastic sealed container, followed by vigorous shaking for 2 hours at 25° C. to yield a homogeneous dispersion. The dispersion was divided into two, and then to each half there were added 3 g of an epoxy resin (agent A) of a commercially available epoxy-based adhesive agent (by Konishi Co., Ltd.), and a denatured polyamide (agent B), followed by vigorous shaking to yield homogeneous dispersions. The two dispersions were mixed next, followed by further vigorous shaking for 20 minutes at 25° C. to yield a homogeneous clay paste.

This clay paste was deaerated next in a vacuum defoaming apparatus. The clay paste was then applied onto a metal plate having bonded thereto a 0.1 mm-thick Teflon™ film. A nonwoven fabric made of fine glass fibers was then placed on the Teflon™ film, and then the clay paste was applied so as to fill the nonwoven fabric. The thickness of the nonwoven fabric was about 25 μm. A ground spatula made of stainless steel was used to apply the clay paste. Using a 3 mm-high spacer as a guide there was molded a clay paste film having a uniform thickness. The tray was left to dry naturally at room temperature, to yield a uniform denatured clay thin film having a thickness of about 45 μm. After standing for 24 hours, the denatured clay film was detached from the tray, to yield a self-supporting film (FRWR30-45) having excellent flexibility.

(2) Characteristics of the Fiber-Reinforced Denatured Clay Film

FRWR30-45 was immersed in distilled water for 1 hour. After that treatment, no anomalies such as pinholes, cracks or the like or the like were observable to the naked eye. The pliability of the film was measured using a mandrel bend tester (ISO1519). FRWR30-45 exhibited no defects such as cracks or the like even when bent to a radius of 6 mm. Upon measurement of the tensile strength thereof, the film exhibited a rupture strength of 68 MPa.

Example 8

(1) Manufacture of a Denatured Clay Thin Film

A commercially available product (by Hojun Co. Ltd.) in which a dimethylstearylbenzyl-type quaternary ammonium ions, and trimethoxysilane as a silylating agent, are introduced in natural bentonite, was used as a denatured clay. The denatured clay was added, in an amount of 14 g, to 440 $cm^3$ of toluene, then the whole was placed, together with a Teflon™ rotor, in a plastic sealed container, followed by vigorous shaking for 2 hours at 25° C. to yield a homogeneous dispersion. The dispersion was divided into two, and then to each half there were added 3 g of an epoxy resin (agent A) of a commercially available epoxy-based adhesive agent (by Konishi Co., Ltd.), and a denatured polyamide (agent B), followed by vigorous shaking to yield homogeneous dispersions. The two dispersions were mixed next, followed by further vigorous shaking for 20 minutes at 25° C. to yield a homogeneous clay paste.

This clay paste was deaerated next in a vacuum defoaming apparatus. The clay paste was then applied onto 10-μm thick aluminum foil that was kept in horizontal position. A ground spatula made of stainless steel was used to apply the clay paste. Using a 3 mm-high spacer as a guide there was molded a clay paste film having a uniform thickness. The tray was left to dry naturally at room temperature, to yield a uniform denatured clay coating film having a thickness of about 45 μm on the aluminum foil. It was verified that the after film-coating no current flowed between the front and rear of the aluminum foil, which evidenced that the film functions as an electric insulating layer.

Example 9

(1) Manufacture of an Undenatured Clay Thin Film

Natural montmorillonite (Kunipia P, by Kunimine Industries, Inc.), in an amount of 2.765 g, and synthetic mica (Somasif ME-100, by Co-op Chemical Co., Ltd.) in an amount of 0.691 g were added, as clays, to 100 cm³ of distilled water, then the whole was placed, together with a Teflon™ rotor, in a plastic sealed container, followed by vigorous shaking for 2 hours at 25° C. to yield a homogeneous dispersion. To this dispersion there was added, as an additive, 0.144 g of epsilon caprolactam (by Wako Pure Chemical Industries), followed by vigorous shaking, to yield a homogeneous dispersion comprising natural montmorillonite and epsilon caprolactam. This dispersion was dried gradually to yield a clay paste. This clay paste was deaerated next in a vacuum defoaming apparatus. The clay paste was then applied onto a brass plate. A ground spatula made of stainless steel was used to apply the clay paste. Using a spacer as a guide there was molded a clay paste film having a uniform thickness. The thickness of the paste was 2 mm. The tray was placed in a forced draft oven and was dried for 1 hour under temperature conditions of 60° C., to yield a homogeneous additive-composite clay film having a thickness of about 40 μm.

(2) Manufacture of a Multilayer Film

A commercially available product (by Hojun Co. Ltd.) in which a dimethylstearylbenzyl-type quaternary ammonium ions, and trimethoxysilane as a silylating agent, are introduced in natural bentonite, was used as a denatured clay. The denatured clay was added, in an amount of 14 g, to 440 cm³ of toluene, then the whole was placed, together with a Teflon™ rotor, in a plastic sealed container, followed by vigorous shaking for 2 hours at 25° C. to yield a homogeneous dispersion. The dispersion was divided into two, and then to each half there were added 3 g of an epoxy resin (agent A) of a commercially available epoxy-based adhesive agent (by Konishi Co., Ltd.), and a denatured polyamide (agent B), followed by vigorous shaking to yield homogeneous dispersions. The two dispersions were mixed next, followed by further vigorous shaking for 20 minutes at 25° C. to yield a homogeneous clay paste. This clay paste was deaerated next in a vacuum defoaming apparatus. This clay paste was then applied onto an additive-composite clay film A. A ground spatula made of stainless steel was used to apply the clay paste. Using a 2 mm-high spacer as a guide there was molded a clay paste film having a uniform thickness. The tray was left to dry naturally at room temperature, to yield a multilayer film DL(HW), having a total thickness of about 70 μm comprising a uniform denatured clay thin film, having a thickness of about 30 μm, coated onto the additive-composite clay film.

(3) Characteristics of the Multilayer Film

The oxygen permeability coefficient of DL(HW) was measured using a Gasperm-100 device, from Jasco Corp. As a result there was obtained an oxygen gas permeability coefficient of less than $1.28 \times 10^{-9}$ $cm^2 s^{-1}$ $cmHg^{-1}$ at room temperature, which indicated high gas barrier performance. The pliability of the film was measured using a mandrel bend tester (ISO1519). DL(HW) exhibited no defects such as cracks or the like even when bent to a radius of 2 mm.

Example 10

(1) Manufacture of a Denatured Clay Thin Film

A commercially available product (by Hojun Co. Ltd.) in which a dimethylstearylbenzyl-type quaternary ammonium ions, and trimethoxysilane as a silylating agent, are introduced in natural bentonite, was used as a denatured clay. The denatured clay was added, in an amount of 14 g, to 440 cm³ of toluene, then the whole was placed, together with a Teflon™ rotor, in a plastic sealed container, followed by vigorous shaking for 2 hours at 25° C. to yield a homogeneous dispersion. The dispersion was divided into two, and then to each half there were added 3 g of an epoxy resin (agent A) of a commercially available epoxy-based adhesive agent (by Konishi Co., Ltd.), and a denatured polyamide (agent B), followed by vigorous shaking to yield homogeneous dispersions. The two dispersions were mixed next, followed by further vigorous shaking for 20 minutes at 25° C. to yield a homogeneous clay paste. This clay paste was deaerated next in a vacuum defoaming apparatus (clay paste C). The clay paste C was then applied onto a metal plate having bonded thereto a 0.1 mm-thick Teflon™ film. A ground spatula made of stainless steel was used to apply the clay paste. Using a 2 mm-high spacer as a guide there was molded a clay paste film having a uniform thickness. The tray was left to dry naturally at room temperature, to yield a uniform denatured clay thin film having a thickness of about 30 μm.

(2) Manufacture of a Two-Layer Film

Natural montmorillonite (Kunipia P, by Kunimine Industries, Inc.), in an amount of 2.765 g, and synthetic mica (Somasif ME-100, by Co-op Chemical Co., Ltd.) in an amount of 0.691 g, were added, as clays, to 100 cm³ of distilled water, then the whole was placed, together with a Teflon™ rotor, in a plastic sealed container, followed by vigorous shaking for 2 hours at 25° C. to yield a homogeneous dispersion. To this dispersion there was added, as an additive, 0.144 g of epsilon caprolactam (by Wako Pure Chemical Industries), followed by vigorous shaking, to yield a homogeneous dispersion comprising natural montmorillonite and epsilon caprolactam. This dispersion was dried gradually to yield a clay paste. This clay paste was deaerated next in a vacuum defoaming apparatus. The clay paste was then applied onto the denatured clay thin film. A ground spatula made of stainless steel was used to apply the clay paste. Using a spacer as a guide there was molded a clay paste film having a uniform thickness. The thickness of the paste was 2 mm. The tray was placed in a forced draft oven and was dried for 1 hour under temperature conditions of 60° C., to yield a uniform two-layer film having a total thickness of about 70 μm, in which the thickness of the non-denatured clay was about 40 μm.

(3) Manufacture of a Three-Layer Film

The clay paste C was applied onto the two-layer film. A ground spatula made of stainless steel was used to apply the clay paste. Using a 2 mm-high spacer as a guide there was molded a clay paste film having a uniform thickness. The film was left to dry naturally at room temperature, to yield a three-layer film TL(WHW), having a total thickness of about 100 µm, comprising a uniform denatured clay thin film having a thickness of about 30 µm.

(4) Characteristics of the Denatured Clay Multilayer Film

The oxygen permeability coefficient of TL(WHW) was measured using a Gasperm-100 device, from Jasco Corp. As a result there was obtained an oxygen gas permeability coefficient of less than $1.28 \times 10^{-9}$ cm$^2$s$^{-1}$ cmHg$^{-1}$ at room temperature, which indicated high gas barrier performance. The water-vapor permeability (JIS Z0208-1976) of the film was of 4.9 g/m$^2$/day as measured by a cup method. The pliability of the film was measured using a mandrel bend tester (ISO1519). TL(WHW) exhibited no defects such as cracks or the like even when bent to a radius of 2 mm. The total transmissivity of TL(WHW) was of 38.3%, and the haze 92.1%, based on JIS K7105.

Example 11

(1) Manufacture of a Denatured Clay Thin Film

Bentonite (Kunipia F, by Kunimine Industries, Inc.) sufficiently dried in an oven at a temperature not lower than 110° C. was charged, in an amount of 300 g, in a ball mill pot together with alumina balls. Next there were added 6 g of a silylating agent (Sila-ace S330, by Chisso Corp.) and the interior of the pot was purged with nitrogen, followed by ball milling over 1 hour to yield a denatured clay. The used silylating agent has terminal amino groups. The denatured clay was added in an amount of 24 g to 400 ml of a 0.5N lithium nitrate aqueous solution, followed by mixing and dispersion by shaking. After 2 hours of shaking, interlayer ions of the dispersed clay were replaced by lithium. The clay dispersion was centrifuged for solid-liquid separation, and the obtained solid was washed with a liquid mixture of 280 g of distilled water and 120 g of ethanol, to remove excess salt content. This washing operation was repeated at least twice. The obtained product was thoroughly dried in an oven and was crushed to yield a lithium-exchanged denatured clay. The lithium-exchanged denatured clay was added, in an amount of 15 g, to 485 g of distilled water, followed by mixing and dispersion by shaking for about 2 hours, to yield a lithium-exchanged denatured clay dispersion having a solid-liquid ratio of 3%. Meanwhile, 1,2,4,5-benzenetetracarboxylic acid dianhydride, by Wako Pure Chemical Industries, and 3,3',5, 5'-tetramethylbenzidine, by Dojindo Laboratories, were used as polyimide raw materials. Firstly, 3,3',5,5'-tetramethylbenzidine was dissolved using dimethylacetamide as a solvent, with stirring at 30° C. for 30 minutes. The resulting solution was mixed with 1,2,4,5-benzenetetracarboxylic acid dianhydride, with stirring at 30° C. for 1 hour, to prepare a 16% polyimidic acid paste. The lithium-exchanged denatured clay dispersion and the polyimidic acid paste were mixed to yield a mixed paste. The mixing ratio was set to yield about 20 wt % of polyimidic acid and about 80 wt % of lithium-exchanged denatured clay, on a dry solids basis. Next, this mixed paste was deaerated in a vacuum defoaming apparatus. The mixed paste was applied then onto a metal substrate coated with a fluororesin. A ground spatula made of stainless steel was used to apply the clay paste. Using a spacer as a guide there was molded a mixed paste film having a uniform thickness. The thickness of the mixed paste was 1 mm. The mixed paste was then dried at room temperature over 4 days, to yield a polyimidic acid-lithium exchanged denatured clay composite film. This mixed film was detached from the metal substrate and was subjected to a thermal treatment in a heating oven. In this thermal treatment, the temperature was raised to 300° C. at a rate of 100° C./hour, after which the temperature was kept at 300° C. for 2 hours. As a result of the thermal treatment there was obtained a polyimide-lithium exchanged denatured clay composite film having a thickness of about 20 µm.

(2) Characteristics of the Denatured Clay Film

The pliability of the film was measured using a mandrel bend tester (ISO1519). The film exhibited no defects such as cracks or the like even when bent to a radius of 2 mm. The permittivity and dielectric tangent at 1 MHz were 4.32 and 0.071, respectively. The volume resistivity of the film was $2.87 \times 10^{11}$ Ωcm. The dielectric breakdown voltage of the film was 14 kVmm$^{-1}$.

Example 12

(1) Manufacture of a Denatured Clay Thin Film

A lithium exchanged denatured clay dispersion was obtained in the same way as in Example 11. The dispersion was deaerated in a vacuum defoaming apparatus. Next, the dispersion was applied onto a metal substrate. A ground spatula made of stainless steel was used to apply the clay paste. Using a spacer as a guide there was molded a dispersion film having a uniform thickness. The thickness of the dispersion film was 2 mm. The dispersion film was then dried overnight, at 60° C., in a forced convection oven, was then detached from the metal substrate, and was subjected to a thermal treatment in a heating oven. In this thermal treatment, the temperature was raised to 350° C. at a rate of 100° C./hour, after which the temperature was kept at 350° C. for 2 hours. As a result of the thermal treatment there was obtained a lithium exchanged denatured clay film having a thickness of about 60 µm.

(2) Characteristics of the Denatured Clay Film

The pliability of the film was measured using a mandrel bend tester (ISO1519). The film exhibited no defects such as cracks or the like even when bent to a radius of 6 mm. The permittivity of the film at 1 MHz was 5.54. The volume resistivity of the film was $3.2 \times 10^{11}$ Ωcm. A 5% weight reduction temperature of 760° C. was measured using a thermogravimeter. The average linear thermal expansion coefficient of the film from 50° C. to 250° C., in a direction parallel to the film plane, was not greater than 5.1 ppm. The results of a chemical resistance test in accordance with JIS K6258-1993 (weight change after immersion for 72 hours at 40° C.) against distilled water, brine (10 wt % NaCl), an alkali (1 wt % NaOH), toluene, acetone, ethyl acetate and ethanol were 28%, 21%, non-evaluable, 0%, 37%, 18% and 26%, respectively.

Example 13

(1) Manufacture of a Denatured Clay Composite Film

A lithium exchanged denatured clay was obtained in the same way as in Example 11. To 1 part by weight of this denatured clay there were added 9 parts by weight of distilled water, followed by mixing and kneading, to prepare a pre-gel. To the pre-gel there was further added ethanol in an amount of 16 parts by weight relative to 1 part by weight of denatured clay, to prepare a denatured clay paste. In that paste there was dissolved next an additive Toresin FS350, by Nagase ChemteX Co. (solid-liquid ratio 18.2 wt %) through stirring for 2 hours, to yield a mixed paste. The mixing ratio was set herein to yield about 20 wt % of additive and about 80 wt % of lithium-exchanged denatured clay on a dry solids basis. Next, this mixed paste was deaerated in a vacuum defoaming apparatus. The mixed paste was then applied onto a metal substrate. A ground spatula made of stainless steel was used to apply the clay paste. Using a spacer as a guide there was molded a paste having a uniform thickness. The thickness of the paste was 2 mm. The paste was then dried overnight, at 60° C., in a forced convection oven, was then detached from the metal substrate, and was subjected to a thermal treatment in a heating oven. In this thermal treatment, the temperature was raised to 300° C. at a rate of 100° C./hour, after which the temperature was kept at 300° C. for 2 hours. As a result of the thermal treatment there was obtained a lithium exchanged denatured clay composite film having a thickness of about 30 μm.

(2) Characteristics of the Denatured Clay Composite Film

The pliability of the film was measured using a mandrel bend tester (ISO1519). The film exhibited no defects such as cracks or the like even when bent to a radius of 5 mm. The permittivity of the film at 1 MHz was of 3.78. The volume resistivity of the film was $1.9 \times 10^{16}$ Ωcm. The water-vapor permeability (JIS Z0208-1976) of the film was of 2.4 g/m²/day as measured by a cup method. A 5% weight reduction temperature of 393° C. was measured using a thermogravimeter. The average linear thermal expansion coefficient of the film from 50 to 250° C., in a direction parallel to the film plane, was not greater than 6.5 ppm. The results of a chemical resistance test in accordance with JIS K6258-1993 (weight change after immersion for 72 hours at 40° C.) against distilled water, brine (10 wt % NaCl), an alkali (1 wt % NaOH), toluene, acetone, ethyl acetate and ethanol was of 26%, 17%, non-evaluable, −1%, 1%, 0% and 1%, respectively.

Example 14

(1) Manufacture of a Denatured Clay Composite Film

A lithium exchanged denatured clay was obtained as in Example 11. To 1 part by weight of this denatured clay there were added 9 parts by weight of distilled water, followed by mixing and kneading, to prepare a pre-gel. To the pre-gel there was further added dimethylacetamide in an amount of 22 parts by weight relative to 1 part by weight of denatured clay, to prepare a denatured clay paste. A lignin-derived epoxy resin, as an additive, was dissolved in the denatured clay paste through stirring for 2 hours, to yield a mixed paste. The mixing ratio was set to yield about 20 wt % of additive and about 80 wt % of lithium-exchanged denatured clay on a dry solids basis. Next, this mixed paste was deaerated in a vacuum defoaming apparatus. The mixed paste was then applied onto a metal substrate. A ground spatula made of stainless steel was used to apply the mixed paste. Using a spacer as a guide there was molded a paste having a uniform thickness. The thickness of the paste was 1 mm. The paste was then dried overnight, at 60° C., in a forced convection oven, was then detached from the metal substrate, and was subjected to a thermal treatment in a heating oven. In this thermal treatment, the temperature was raised to 150° C. at a rate of 100° C./hour, after which the temperature was kept at 150° C. for 2 hours. The temperature was further raised to 230° C. at a rate of 100° C./hour, after which the temperature was kept at 230° C. for 24 hours. As a result of the thermal treatment there was obtained a lithium exchanged denatured clay composite film having a thickness of about 20 μm.

(2) Characteristics of the Denatured Clay Composite Film

The pliability of the film was measured using a mandrel bend tester (ISO1519). The film exhibited no defects such as cracks or the like even when bent to a radius of 2 mm. The permittivity of the film at 1 MHz was of 9.1. The volume resistivity of the film was $2.4 \times 10^{15}$ Ωcm. The water-vapor permeability (JIS Z0208-1976) of the film was of 2.0 g/m²/day as measured by a cup method. A 5% weight reduction temperature of 334° C. was measured using a thermogravimeter. The average linear thermal expansion coefficient of the film, from 50 to 250° C., in a direction parallel to the film plane, was not greater than 9.0 ppm. The results of a chemical resistance test in accordance with JIS K6258-1993 (weight change after immersion for 72 hours at 40° C.) against distilled water, brine (10 wt % NaCl), an alkali (1 wt % NaOH), toluene, acetone, ethyl acetate and ethanol were 13%, 13%, non-evaluable, 1%, 7%, 0% and 0%, respectively.

Example 15

Bentonite (Kunipia F, by Kunimine Industries, Inc.) sufficiently dried in an oven at a temperature not lower than 110° C. was charged, in an amount of 300 g, in a ball mill pot together with alumina balls. Next there were added 6 g of a silylating agent (Sila-ace S330, by Chisso Corp.) and the interior of the pot was purged with nitrogen, followed by ball milling over 1 hour to yield a denatured clay. The used silylating agent has terminal amino groups. This was denatured clay A. Meanwhile, bentonite (Kunipia F, by Kunimine Industries, Inc.) sufficiently dried in an oven at a temperature not lower than 110° C. was charged, in an amount of 300 g, in a ball mill pot together with alumina balls. Next there were added 6 g of a silylating agent (Sila-ace S510, by Chisso Corp.) and the interior of the pot was purged with nitrogen, followed by ball milling over 1 hour to yield a denatured clay B. The used silylating agent has terminal epoxy groups. Equivalent weights of the denatured clay A and the denatured clay B were mixed thoroughly, and distilled water was added to the mixture, with mixing and dispersion through shaking for about 2 hours, to yield a denatured clay mixture dispersion having a solid-liquid ratio of about 3%. Next, this denatured clay mixture dispersion was deaerated in a vacuum defoaming apparatus. The denatured clay mixture dispersion was applied onto a metal substrate. A ground spatula made of stainless steel was used to apply the clay paste. Using a spacer as a guide there was molded a paste having a uniform thickness. The thickness of the dispersion was 5 mm. The dispersion was then dried over three days, at 60° C., in a forced convection oven and was then detached from the metal substrate to yield a denatured clay mixture self-supporting film. The above treatment resulted in the formation of chemical bonds between the lithium exchanged denatured clay A and the denatured clay B, yielding eventually a denatured clay self-supporting film having a thickness of about 90 μm.

As described above, the present invention relates to a film material being a film having a denatured clay as a main constituent thereof, wherein the film material has sufficient mechanical strength to be used as a self-supporting film, with a more highly oriented layering of denatured clay particles. The film material, which can be used at high-temperature conditions, beyond 150° C., has excellent water resistance, flexibility, gas barrier properties, water-vapor barrier properties, can be made into a laminate film together with films of other materials, and can also be employed as a surface protective film of other materials. The denatured clay film of the present invention, moreover, is ion-conductive.

Therefore, the denatured clay film of the present invention, which is a member that withstands high-temperature conditions during production or processing, can be used in a wide range of applications as a film material having excellent flexibility. The denatured clay film of the present invention can be widely used as a film material having excellent flexibility under high-temperature conditions. The denatured clay film of the present invention can be widely used as a film material where high gas barrier properties and high water-vapor properties are required. The denatured clay film of the present invention, moreover, can be widely used as well as one layer comprised in a laminate film. In addition, the denatured clay film of the present invention can be widely used as a surface protective film of other materials. Furthermore, the denatured clay film of the present invention can be used in a wide range of applications as an ion-conductive membrane.

Accordingly, the denatured clay film of the present invention can be used in many manufactured articles. Examples of such articles include, for instance, an LCD substrate film, an organic EL substrate film, an electronic paper substrate film, an electronic device encapsulating film, a PDP film, an LED film, an optical communication member, a substrate film for various functional films, an IC tag film, a flexible film for other kinds of electronic device, a fuel cell sealing film, a solar battery film, a food packaging film, a beverage packaging film, a medicinal-product packaging film, a packaging film for daily necessities, a packaging film for industrial articles, as a packaging film for other various articles, and a gas-barrier sealing material against gaseous species such as carbon dioxide and hydrogen, a multilayer packaging film, an oxidation-resistant film, a corrosion-resistant film, a weather-resistant film, a flame-resistant film, a heat-resistant film, a chemical-resistant film, a fuel cell membrane, and the like.

What is claimed is:

1. A film of a material comprising:
a denatured clay and an additive,
wherein
the denatured clay comprises at least one clay selected from the group consisting of mica, vermiculite, montmorillonite, beidellite, saponite, hectorite, stevensite, magadiite, ilerite, kanemite, illite and sericite,
the weight ratio of the denatured clay is not less than 70% relative to total solids,
the denatured clay comprises a clay with lithium ions wherein the lithium ions are at least 50% within an interlayer of ionic substances of the clay, a silylated clay reacted with a silylating agent having a reactive end, and an organic cation present in an amount of less than 30 wt %, based on the total weight of the denatured clay,
the additive is a lignin-based epoxy resin or a sucrose-based epoxy resin,
the film has a 5% weight reduction temperature of 235° C. to 760° C. as measured by thermogravimetry,
the water-vapor permeability of the film at 40° C. and 90% relative humidity is less than 6 $gm^{-2}day^{-1}$,
the film has been subjected to at least one surface treatment selected from the group consisting of a water-repellency treatment, a water-proofing treatment, a reinforcement treatment, and a surface flattening treatment,
and wherein the film has
gas barrier properties,
sufficient mechanical strength to be used as a self-supporting film, and
water resistance obtained by a thermal treatment.

2. The film according to claim 1, wherein a chlorine concentration of said film is less than 150 ppm.

3. The film according to claim 1, wherein the amount of silylating agent relative to the clay and silylating agent is less than 30wt %.

4. The film according to claim 1, wherein the silylated clay is an epoxy-terminated silylated clay, and covalent bonds are formed between clays by an epoxy reaction in a film manufacture process.

5. The film according to claim 1, wherein the silylated clay comprises a mixture of a silylated clay A and a silylated clay B, and covalent bonds are formed between the clays by causing the ends of the silylated clay A to react with the ends of the silylated clay B.

6. The film according to claim 1, wherein the surface treatment comprises forming, on the surface of the film, a silicon oxide film, a fluorine-based film, a silicon-based film, a polysiloxane film, a fluorine-containing organopolysiloxane film, an acrylic resin film, a vinyl chloride resin film, a polyurethane resin film, a high water-repellent plating film, a metallic vapor deposition film, or a carbon vapor deposition film.

7. The film according to claim 1, wherein the film is reinforced with a reinforcing material.

8. The film according to claim 1, wherein said film has light transmittance properties, gas barrier properties, water-vapor barrier properties and/or sufficient mechanical strength to be used as a self-supporting film, said properties being obtained by forming new chemical bonds within molecules of the additive, between the molecules of the additive, between the additive and an inorganic layered compound, and between inorganic layered compound crystals, through an addition reaction, a condensation reaction or a polymerization reaction, using heating or light irradiation.

9. The film according to claim 1, wherein the thickness of the film is 0.003 mm to 0.3 mm.

10. The film according to claim 1, wherein the film has a permeability coefficient to oxygen gas of less than $2.0\times10^{-9}$ $cm^2s^{-1}cmHg^{-1}$ at room temperature.

11. The film according to claim 1, wherein the water-vapor permeability of the film at 40° C. and 90% relative humidity is less than 10 $gm^{-2}day^{-1}$.

12. The film according to claim 1, wherein the water absorption rate of the film at 20° C. and 65% relative humidity is less than 2%.

13. The film according to claim 1, wherein the film exhibits no visibly observable damage in shape, and has a permeability coefficient to oxygen gas of less than $2.0\times10^{-9}$ $cm^2s^{-1}cmHg^{-1}$ at room temperature, after immersion for 1 hour in superheated water at 150° C.

14. The film according to claim 1, wherein the volume resistivity in a direction perpendicular to the film is at least $2.8\times10^{11}$ $\Omega cm$.

15. The film according to claim 1, wherein the ion conductivity in a direction perpendicular to the film is at least $1\times10^{-4}$ $Scm^{-1}$.

16. The film according to claim 1, wherein the film is capable of being used without cracking at a bending radius of 8 mm.

17. The film according to claim 1, wherein the average linear thermal expansion coefficient of the film from 50° C. to 250° C. in a direction parallel to the film plane is 5 ppm to 10 ppm.

18. A multilayer film comprising a film A and a film B, wherein the film A and the film B are according to claim 1 and the constituents of the film A and the film B are not the same.

19. A composite multilayer film comprising a film according to claim 1, and at least one selected from the group consisting of a metal foil, a plastic film, rubber and paper.

20. A surface protective film comprising a film according to claim 1.

21. A sealing material, packaging material, protective material, heat insulating material, electric insulating material, heat resistant material, noncombustible material or fuel cell membrane comprising a film according to claim 1.

22. A method for manufacturing the film defined in claim 1, comprising: preparing a denatured clay pre-gel by adding a pre-gel solvent of a denatured clay; adding thereafter a polar solvent; and then adding an additive.

23. A method for manufacturing the film according to claim 1 wherein the average linear thermal expansion coefficient of the film from 50° C. to 250° C. in a direction parallel to the film plane is 5 ppm to 10 ppm,
said method comprising:
forming, on the surface of said film according to claim 1, a multilayer film comprising
a film A, and
a film B,
wherein
the film A and the film B are each according to claim 1,
the constituents of the film A and the film B are not the same, and
the multilayer film comprises a film having a non-denatured clay as a main component thereof;
or said method comprising forming said film according to claim 1 on the surface of said multilayer film.

24. The film according to claim 5, wherein the ends of the silylated clay A are epoxy groups, and the ends of the silylated clay B are amino groups.

25. The film according to claim 7, wherein the reinforcing material is one or more selected from the group consisting of mineral fibers, glass wool, carbon fibers, ceramic fibers, plant fibers and organic polymer fibers.

26. The film according to claim 7, wherein the reinforcing material has the form of a fabric.

27. The film according to claim 7, wherein the weight ratio of the reinforcing material is at most 30% relative to total solids.

28. The film according to claim 26, wherein the fabric is a woven fabric, a nonwoven fabric or paper.

29. The multilayer film according to claim 18, wherein the film comprises a film having a non-denatured clay as a main component thereof.

30. The multilayer film according to claim 18, wherein the weight ratio of the additive is at most 30% relative to total solids.

31. The multilayer film according to claim 18, wherein said multilayer film has light transmittance properties, gas barrier properties, water-vapor barrier properties and/or sufficient mechanical strength to be used as a self-supporting film, said properties being obtained by forming new chemical bonds within molecules of the additive, between the molecules of the additive, between the additive and an inorganic layered compound, and between inorganic layered compound crystals, through an addition reaction, a condensation reaction or a polymerization reaction, using heating or light irradiation.

32. The multilayer film according to claim 18, wherein the thickness of the multilayer film is 0.003 mm to 0.5 mm.

33. The multilayer film according to claim 18, wherein the multilayer film has a permeability coefficient to oxygen gas of less than $2.0 \times 10^{-9}$ $cm^2 s^{-1} cmHg^{-1}$ at room temperature.

34. The multilayer film according to claim 29, wherein the film having a non-denatured clay as a main component thereof is in a weight ratio of at least 70% relative to clay total solids, and has gas barrier properties.

35. The multilayer film according to claim 29, wherein the non-denatured clay is a natural or synthetic clay.

36. The multilayer film according to claim 29, wherein the non-denatured clay is at least one selected from the group consisting of mica, vermiculite, montmorillonite, iron montmorillonite, beidellite, saponite, hectorite, stevensite and nontronite.

37. The multilayer film according to claim 29, wherein an additive of the film having a non-denatured clay as a main component thereof is at least one selected from the group consisting of epsilon caprolactam, dextrin, starch, cellulose resins, gelatin, agar, wheat flour, gluten, alkyd resins, polyurethane resins, epoxy resins, fluororesins, acrylic resins, methacrylic resins, phenolic resins, polyamide resins, polyester resins, polyimide resins, polyvinyl resins, polyethylene glycol, polyacrylamide, polyethylene oxide, proteins, deoxyribonucleic acid, ribonucleic acid, polyamino acids, polyhydric phenols and benzoic acid compounds.

38. The composite multilayer film according to claim 19, comprising, as a plastic film, at least one selected from the group consisting of polyethylene, polypropylene, polyethylene terephthalate, a polyamide, a fluororesin, an acrylic resin, a polyimide, a polyallylate, a polysulfone and a polyetherimide.

39. The surface protective film according to claim 20, wherein a material to be protected is a metal, a metal oxide, ceramics, plastics, a plastic foamed material, wood, plaster or rubber.

40. The method for manufacturing the film according to claim 22, wherein the pre-gel solvent of a denatured clay is water.

41. The method for manufacturing the film according to claim 22, wherein the polar solvent is ethanol or dimethylacetamide.

* * * * *